US012236855B2

(12) United States Patent
Xie et al.

(10) Patent No.: US 12,236,855 B2
(45) Date of Patent: Feb. 25, 2025

(54) PIXEL CIRCUIT, DRIVING METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Shuai Xie, Beijing (CN); Xuewei Tian, Beijing (CN); Ling Shi, Beijing (CN); Yipeng Chen, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/772,152

(22) PCT Filed: May 25, 2021

(86) PCT No.: PCT/CN2021/095688

§ 371 (c)(1),
(2) Date: Apr. 27, 2022

(87) PCT Pub. No.: WO2022/246631

PCT Pub. Date: Dec. 1, 2022

(65) Prior Publication Data

US 2024/0144867 A1 May 2, 2024

(51) Int. Cl.
*G09G 3/3208* (2016.01)

(52) U.S. Cl.
CPC ... *G09G 3/3208* (2013.01); *G09G 2300/0426* (2013.01); *G09G 2300/0819* (2013.01);
(Continued)

(58) Field of Classification Search
CPC ......... G09G 3/3208; G09G 2300/0426; G09G 2300/0819; G09G 2300/0842;
(Continued)

(56) References Cited

U.S. PATENT DOCUMENTS

2017/0092178 A1 3/2017 Lee et al.
2018/0151115 A1 5/2018 Tseng et al.
(Continued)

FOREIGN PATENT DOCUMENTS

CN 106531076 A 3/2017
CN 106991944 A 7/2017
(Continued)

OTHER PUBLICATIONS

Office Action dated Oct. 28, 2024 for Chinese Patent Application No. 202180001245.4 and English Translation.

*Primary Examiner* — Stacy Khoo
(74) *Attorney, Agent, or Firm* — Ling Wu; Stephen Yang; Ling and Yang Intellectual Property

(57) ABSTRACT

Disclosed are a pixel circuit, a driving method thereof, and a display apparatus. The pixel circuit includes a driving sub-circuit, a writing sub-circuit, a compensation sub-circuit, a reset sub-circuit, and a light-emitting element, the driving sub-circuit provides a driving current to a third node in response to a control signal of a first node; the writing sub-circuit writes a signal of a data signal line to a second node in response to a control signal of a first scan signal line, the signal of the data signal line is a data voltage signal or a reset voltage signal; the compensation sub-circuit writes the reset voltage signal to the third node in response to a control signal of the first scan signal line; the compensation sub-circuit further compensates the first node in response to a control signal of the first scan signal line.

19 Claims, 19 Drawing Sheets

(52) U.S. Cl.
CPC ............... *G09G 2300/0842* (2013.01); *G09G 2310/0262* (2013.01); *G09G 2310/08* (2013.01); *G09G 2320/0233* (2013.01); *G09G 2320/0247* (2013.01)

(58) Field of Classification Search
CPC ....... G09G 2310/0262; G09G 2310/08; G09G 2320/0233; G09G 2320/0247
See application file for complete search history.

(56) References Cited

U.S. PATENT DOCUMENTS

| | | | | |
|---|---|---|---|---|
| 2019/0164500 | A1* | 5/2019 | Shi | G09G 3/3258 |
| 2019/0371237 | A1 | 12/2019 | Qian et al. | |
| 2020/0082765 | A1* | 3/2020 | Zhang | G09G 3/3266 |
| 2020/0135106 | A1 | 4/2020 | Lu et al. | |
| 2020/0135114 | A1 | 4/2020 | Lee et al. | |
| 2020/0184893 | A1 | 6/2020 | Dong | |
| 2021/0335260 | A1 | 10/2021 | Wang et al. | |
| 2022/0310017 | A1 | 9/2022 | Yang | |

FOREIGN PATENT DOCUMENTS

| | | | |
|---|---|---|---|
| CN | 107591124 | A | 1/2018 |
| CN | 108154845 | A | 6/2018 |
| CN | 108206008 | A | 6/2018 |
| CN | 108777130 | A | 11/2018 |
| CN | 109285500 | A | 1/2019 |
| CN | 109509427 | A | 3/2019 |
| CN | 109524447 | A | 3/2019 |
| CN | 109767725 | A | 5/2019 |
| CN | 109903724 | A | 6/2019 |
| CN | 110085170 | A | 8/2019 |
| CN | 110268465 | A | 9/2019 |
| CN | 110570818 | A | 12/2019 |
| CN | 110728952 | A | 1/2020 |
| CN | 111445848 | A | 7/2020 |
| CN | 111445854 | A | 7/2020 |
| CN | 112233621 | A | 1/2021 |
| CN | 112397030 | A | 2/2021 |

* cited by examiner

PIXEL CIRCUIT, DRIVING METHOD THEREOF, AND DISPLAY APPARATUS

CROSS-REFERENCE TO RELATED APPLICATION

The present application is a U.S. National Phase Entry of International Application PCT/CN2021/095688 having an international filing date of May 25, 2021, the contents disclosed in the above-mentioned application are hereby incorporated as a part of this application.

TECHNICAL FIELD

Embodiments of the present disclosure relate to, but are not limited to, the field of display technologies, and in particular to a pixel circuit, a method for driving the pixel circuit, and a display apparatus.

BACKGROUND

An Organic Light-emitting Diode (OLED) and an Quantum-dot Light-emitting Diode (QLED) are active light-emitting display devices, which have advantages such as self-luminescence, wide angle of view, high contrast ratio, low power consumption, extremely high response speed, lightness and thinness, flexibility, and low cost. With continuous development of display technologies, a flexible display apparatus (Flexible Display) with an OLED or a QLED being a light-emitting device and signals being controlled by a Thin Film Transistor (TFT) has become a mainstream product in the field of display.

SUMMARY

The following is a summary of subject matters described herein in detail. The summary is not intended to limit the scope of protection of claims.

An embodiment of the present disclosure provides a pixel circuit including a driving sub-circuit, a writing sub-circuit, a compensation sub-circuit, and a reset sub-circuit, wherein the driving sub-circuit is connected with a first node, a second node, and a third node respectively, and is configured to provide a driving current to the third node in response to a control signal of the first node; the writing sub-circuit is connected with a first scan signal line, a data signal line, and the second node respectively, and is configured to write a signal of the data signal line to the second node in response to a control signal of the first scan signal line, wherein the signal of the data signal line is a data voltage signal or a reset voltage signal; the compensation sub-circuit is connected with a first power supply line, the first scan signal line, the first node, and the third node respectively, and is configured to write the reset voltage signal to the third node in response to the control signal of the first scan signal line; the compensation sub-circuit is further configured to compensate the first node in response to the control signal of the first scan signal line; and the reset sub-circuit is connected with the first scan signal line, a second scan signal line, the first node, and the second node respectively, and is configured to write the reset voltage signal to the first node in response to control signals of the first scan signal line and the second scan signal line.

In an exemplary embodiment, the reset sub-circuit includes a second transistor and a fourth transistor; a control electrode of the second transistor is connected with the first scan signal line, a first electrode of the second transistor is connected with a second electrode of the fourth transistor, and a second electrode of the second transistor is connected with the first node; a control electrode of the fourth transistor is connected with the second scan signal line, and a first electrode of the fourth transistor is connected with the second node; or the control electrode of the second transistor is connected with the first scan signal line, a first electrode of the second transistor is connected with the second node, and the second electrode of the second transistor is connected with the first electrode of the fourth transistor; and the control electrode of the fourth transistor is connected with the second scan signal line, and the second electrode of the fourth transistor is connected with the first node.

In an exemplary embodiment, the compensation sub-circuit includes a sixth transistor and a storage capacitor, the driving sub-circuit includes a third transistor, and the writing sub-circuit includes a fifth transistor; a control electrode of the sixth transistor is connected with the first scan signal line, a first electrode of the sixth transistor is connected with the third node, and a second electrode of the sixth transistor is connected with the first node; one end of the storage capacitor is connected with the first node, and the other end of the storage capacitor is connected with the first power supply line; a control electrode of the third transistor is connected with the first node, a first electrode of the third transistor is connected with the second node, and a second electrode of the third transistor is connected with the third node; and a control electrode of the fifth transistor is connected with the first scan signal line, a first electrode of the fifth transistor is connected with the data signal line, and a second electrode of the fifth transistor is connected with the second node.

In an exemplary embodiment, the pixel circuit further includes a first light-emitting control sub-circuit and a second light-emitting control sub-circuit, wherein the first light-emitting control sub-circuit is connected with the first power supply line, the first scan signal line, and the second node respectively, and is configured to provide a signal of the first power supply line to the second node in response to the control signal of the first scan signal line; the second light-emitting control sub-circuit is connected with the second scan signal line, the third node, and the fourth node respectively, and is configured to write the reset voltage signal to the fourth node in response to the control signal of the second scan signal line; and the second light-emitting control sub-circuit is further configured to allow a driving current to pass between the third node and the fourth node.

In an exemplary embodiment, the first light-emitting control sub-circuit includes a first transistor and the second light-emitting control sub-circuit includes a seven transistor; a control electrode of the first transistor is connected with the first scan signal line, a first electrode of the first transistor is connected with the first power supply line, and a second electrode of the first transistor is connected with the second node; and a control electrode of the seventh transistor is connected with the second scan signal line, a first electrode of the seventh transistor is connected with the third node, and a second electrode of the seventh transistor is connected with the fourth node.

In an exemplary embodiment, the control signal of the first scan signal line and the control signal of the second scan signal line are provided by two adjacent stages of a same group of shift registers.

In an exemplary embodiment, all of the first transistor, the third transistor, the fourth transistor, and the seventh transistor are first-type transistors, and all of the second transistor, the fifth transistor, and the sixth transistor are second-type transistors, wherein the first-type transistors and the second-type transistors are of different transistor types.

In an exemplary embodiment, the first-type transistors are P-type thin film transistors, and the second-type transistors are N-type thin film transistors.

In an exemplary embodiment, the pixel circuit includes a base substrate, and a first semiconductor layer, a first conductive layer, a second semiconductor layer, a second conductive layer, a third conductive layer, a fourth conductive layer, and a fifth conductive layer which are stacked on the base substrate; the first semiconductor layer includes an active layer of at least one polysilicon transistor, the first conductive layer includes the second scan signal line and a first electrode plate of a storage capacitor, and there is an overlapping region between an orthographic projection of the second scan signal line on the base substrate and an orthographic projection of the active layer of the at least one polysilicon transistor on the base substrate; the second semiconductor layer includes an active layer of at least one oxide transistor, the second conductive layer includes a second electrode plate of the storage capacitor and the first scan signal line, the third conductive layer includes a second auxiliary signal line, and there is an overlapping region between each of an orthographic projection of the first scan signal line on the base substrate and an orthographic projection of the second auxiliary signal line on the base substrate, and an orthographic projection of the active layer of the at least one oxide transistor on the base substrate; and the fourth conductive layer includes first electrodes and second electrodes of multiple polysilicon transistors and first electrodes and second electrodes of multiple oxide transistors, and the fifth conductive layer includes the data signal line and the first power supply line.

In an exemplary embodiment, the polysilicon transistors include a first transistor, a third transistor, a fourth transistor, and a seventh transistor; and the oxide transistors include a second transistor, a fifth transistor, and a sixth transistor.

In an exemplary embodiment, the pixel circuit includes a first region and a second region; and the first transistor is disposed in the first region, the first scan signal line is disposed in the second region, and a control electrode of the first transistor is connected with the first scan signal line through a connection electrode and a via.

In an exemplary embodiment, the pixel circuit includes a first region and a second region; and the seventh transistor, the fourth transistor, and the second scan signal line are all disposed in the second region, a region where the second scan signal line is overlapped with an active layer of the fourth transistor serves as a control electrode of the fourth transistor, and a region where the second scan signal line is overlapped with an active layer of the seventh transistor serves as a control electrode of the seventh transistor.

In an exemplary embodiment, the pixel circuit includes a first region and a second region; and the third transistor is disposed in the first region, the first scan signal line and the seventh transistor are disposed in the second region, and the first scan signal line is disposed between the third transistor and the seventh transistor.

An embodiment of the present disclosure further provides a display apparatus, which includes any one of the above-mentioned pixel circuits.

An embodiment of the present disclosure further provides a method for driving a pixel circuit, which is used for driving any one of the above-mentioned pixel circuits and includes: in a reset stage, a writing sub-circuit writing a reset voltage signal of a data signal line to a second node in response to a control signal of a first scan signal line; a reset sub-circuit writing a reset voltage signal of the second node to a first node in response to control signals of the first scan signal line and a second scan signal line; and a compensation sub-circuit writing a reset voltage signal of the first node to a third node in response to the control signal of the first scan signal line; in a data writing stage, the writing sub-circuit writing a data voltage signal of the data signal line to the second node in response to the control signal of the first scan signal line, and the compensation sub-circuit compensating the first node in response to the control signal of the first scan signal line; and in a light-emitting stage, a driving sub-circuit providing a driving current to the third node in response to a control signal of the first node.

In an exemplary embodiment, the control signal of the first scan signal line and the control signal of the second scan signal line are output by a group of Gate Driver on Array circuits.

In an exemplary embodiment, the control signal of the first scan signal line and the control signal of the second scan signal line are output by two groups of Gate Driver on Array circuits.

In an exemplary embodiment, the data signal line includes multiple signal cycles, a reset voltage signal and a data voltage signal are provided for a row of sub-pixels once in each signal cycle, and a time length of the data voltage signal is a time length of the data writing stage and a time length of the reset voltage signal is a time length of the reset stage.

Other aspects will become apparent upon reading and understanding of the drawings and detailed description.

BRIEF DESCRIPTION OF DRAWINGS

The drawings are used for providing a further understanding of technical solutions of the present disclosure, constitute a part of the specification, and are used for explaining, together with the embodiments of the present disclosure, the technical solutions of the present disclosure, and are not intended to constitute limitations on the technical solutions of the present disclosure. Shapes and sizes of each component in the drawings do not reflect actual scales, but are only intended to schematically describe contents of the present disclosure.

DETAILED DESCRIPTION

Figure 1:
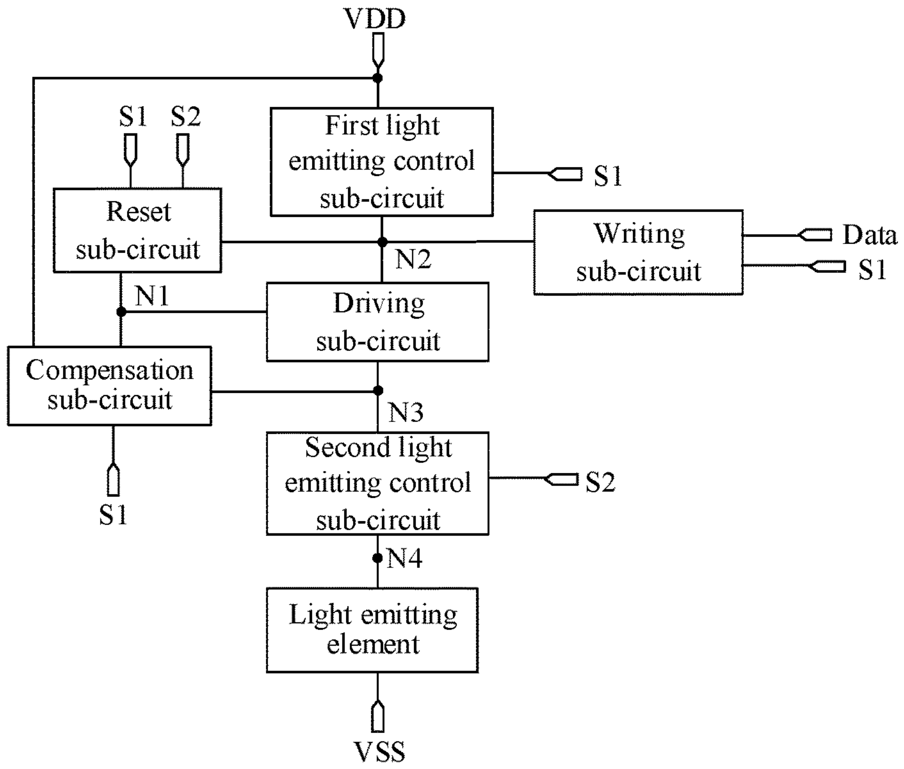
FIG. 1 is a schematic diagram of a structure of a pixel circuit according to an embodiment of the present disclosure.

The embodiments of the present disclosure will be described in detail below with reference to the drawings. It is to be noted that implementation modes may be implemented in multiple different forms. Those of ordinary skills in the art may easily understand such a fact that implementation modes and contents may be transformed into various forms without departing from spirit and scope of the present disclosure. Therefore, the present disclosure should not be construed as only being limited to the contents recorded in following implementation modes. The embodiments in the present disclosure and features in the embodiments may be combined randomly with each other if there is no conflict.

Unless otherwise defined, technical terms or scientific terms used in the embodiments of the present disclosure should have usual meanings understood by those of ordinary skill in the art to which the present disclosure pertains. "First", "second", and similar terms used in the embodiments of the present disclosure do not represent any order, quantity, or importance, but are only used for distinguishing different components. "Include", "contain", or a similar term means that an element or object appearing before the term covers an element or object listed after the term and equivalent thereof and does not exclude other elements or objects.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in this specification, the channel region refers to a region through which the current main flows.

In this specification, a first electrode may be the drain electrode, and a second electrode may be the source electrode. Or, a first electrode may be the source electrode, and a second electrode may be the drain electrode. In cases that transistors with opposite polarities are used, or a direction of a current changes during work of a circuit, or the like, functions of the "source electrode" and the "drain electrode" are sometimes be interchangeable. Therefore, the "source electrode" and the "drain electrode" are interchangeable in this specification.

In the specification, "connection" includes a case that constituent elements are connected through an element with certain electrical function. The "element with the certain electrical function" is not particularly limited as long as electric signals between the connected constituent elements may be sent and received. Examples of the "element with the certain electrical function" not only include electrodes and wirings, but also include switching elements such as transistors, resistors, inductors, capacitors, and other elements with various functions, etc.

An embodiment of the present disclosure provides a pixel circuit. FIG. 1 is a schematic diagram of a structure of the pixel circuit according to the embodiment of the present disclosure. As shown in FIG. 1, the pixel circuit includes a driving sub-circuit, a writing sub-circuit, a compensation sub-circuit, a reset sub-circuit, and a light-emitting element.

Among them, the driving sub-circuit is connected with a first node N1, a second node N2, and a third node N3 respectively, and is configured to provide a driving current to the third node N3 in response to a control signal of the first node N1.

The writing sub-circuit is connected with a first scan signal line S1, a data signal line Data, and the second node N2 respectively, and is configured to write a signal of the data signal line Data to the second node N2 in response to a control signal of the first scan signal line S1. The signal of the data signal line Data is a data voltage signal or a reset voltage signal.

The compensation sub-circuit is connected with a first power supply line VDD, the first scan signal line S1, the first node N1, and the third node N3, respectively, and is configured to write a reset voltage signal of the first node N1 to the third node N3 in response to the control signal of the first scan signal line S1 and is further configured to compensate the first node N1 in response to the control signal of the first scan signal line S1.

The reset sub-circuit is connected with the first scan signal line S1, a second scan signal line S2, the first node N1, and the second node N2, respectively, and is configured to write a reset voltage signal of the second node N2 to the first node N1 in response to control signals of the first scan signal line S1 and the second scan signal line S2.

According to the pixel circuit in the embodiment of the present disclosure, the writing sub-circuit writes the reset voltage signal of the data signal line Data to the second node N2 in response to the control signal of the first scan signal line S1. The reset sub-circuit writes the reset voltage signal of the second node N2 to the first node N1 in response to the control signals of the first scan signal line S1 and the second scan signal line S2. The compensation sub-circuit writes the reset voltage signal of the first node N1 to the third node N3 in response to the control signal of the first scan signal line S1, so that the first node N1 and the third node N3 are reset, a charge on a surface of an anode of the light-emitting element is eliminated, an influence of drift of a threshold voltage of the driving sub-circuit on a driving current of the light-emitting element is avoided, and uniformity of a displayed image and display quality of a display panel are improved. In addition, according to the pixel circuit of the embodiment of the present disclosure, there are fewer leakage channels, thus improving a problem of screen flickering at a low frequency and low brightness.

In an exemplary embodiment, as shown in FIG. 1, the pixel circuit further includes a first light-emitting control sub-circuit and a second light-emitting control sub-circuit.

The first light-emitting control sub-circuit is connected with the first power supply line VDD, the first scan signal line S1, and the second node N2 respectively, and is configured to provide a signal of the first power supply line VDD to the second node N2 in response to the control signal of the first scan signal line S1.

The second light-emitting control sub-circuit is connected with the second scan signal line S2, the third node N3, and a fourth node N4, respectively, and is configured to write a reset voltage signal of the third node N3 to the fourth node N4 in response to the control signal of the second scan signal line S2. The second light-emitting control sub-circuit is further configured to allow a driving current to pass between the third node N3 and the fourth node N4.

In an exemplary embodiment, one end of the light-emitting element is connected with the third node N3 or the fourth node N4, and the other end of the light-emitting element is connected with a second power supply line VSS.

Figure 2:
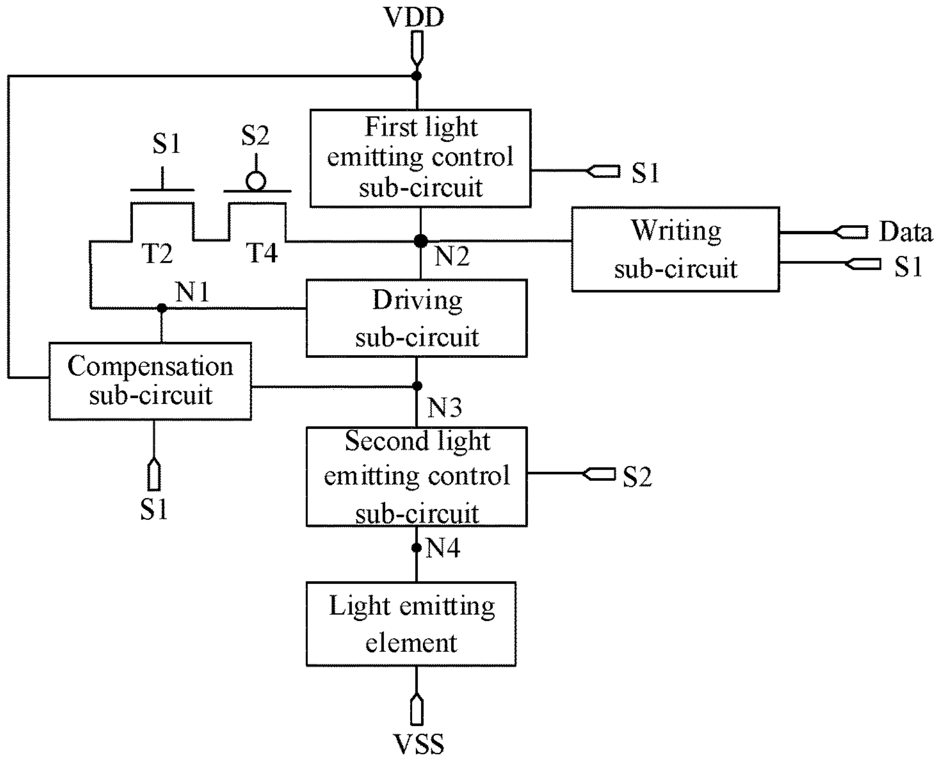
FIG. 2 is an equivalent circuit diagram of a reset sub-circuit according to an embodiment of the present disclosure.

In an exemplary embodiment, FIG. 2 is an equivalent circuit diagram of a reset sub-circuit according to an embodiment of the present disclosure. As shown in FIG. 2, the reset sub-circuit according to the embodiment of the present disclosure includes a second transistor T2 and a fourth transistor T4.

Among them, a control electrode of the second transistor T2 is connected with a first scan signal line S1, a first electrode of the second transistor T2 is connected with a second electrode of the fourth transistor T4, and a second electrode of the second transistor T2 is connected a first node N1.

A control electrode of the fourth transistor T4 is connected with a second scan signal line S2, a first electrode of the fourth transistor T4 is connected with a second node N2.

An exemplary structure of the reset sub-circuit is shown in FIG. 2. It is easy for those skilled in the art to understand that an implementation mode of the reset sub-circuit is not limited thereto as long as a function of the reset sub-circuit can be achieved. In another exemplary embodiment, the control electrode of the second transistor T2 is connected with the first scan signal line S1, the first electrode of the second transistor T2 is connected with the second node N2, and the second electrode of the second transistor T2 is connected with the first electrode of the fourth transistor T4. The control electrode of the fourth transistor T4 is connected with the second scan signal line S2, and a second electrode of the fourth transistor T4 is connected with the first node N1.

Figure 3:
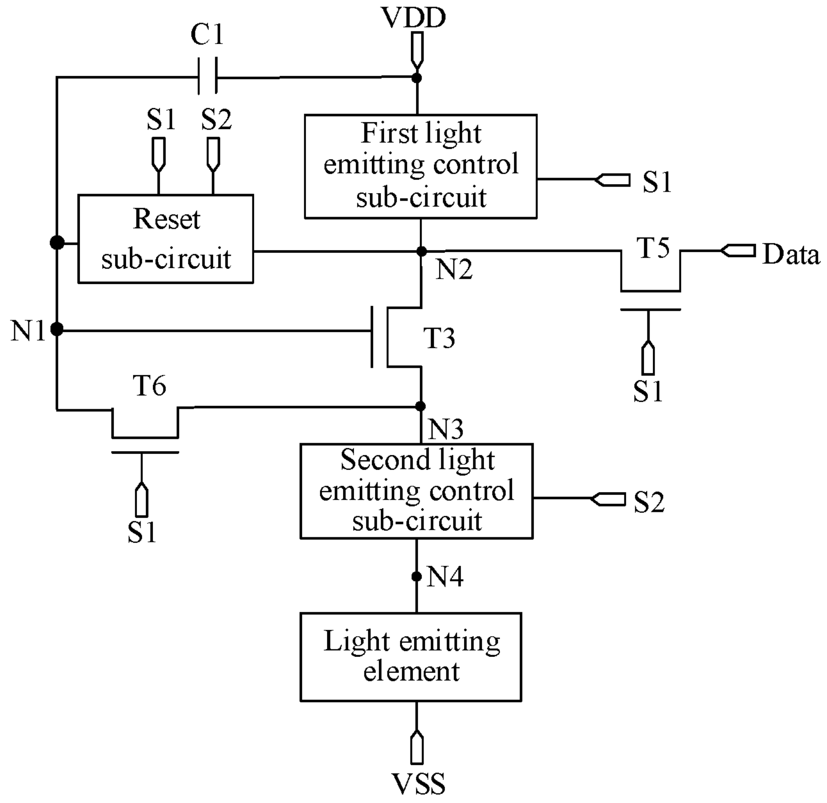
FIG. 3 is an equivalent circuit diagram of a compensation sub-circuit, a driving sub-circuit, and a writing sub-circuit according to an embodiment of the present disclosure.

In an exemplary embodiment, FIG. 3 is an equivalent circuit diagram of a compensation sub-circuit, a driving sub-circuit, and a writing sub-circuit according to an embodiment of the present disclosure. As shown in FIG. 3, the compensation sub-circuit provided in the embodiment of the present disclosure includes a sixth transistor T6 and a storage capacitor C1, the driving sub-circuit includes a third transistor T3, and the writing sub-circuit includes a fifth transistor T5.

Among them, a control electrode of the sixth transistor T6 is connected with the first scan signal line S1, a first electrode of the sixth transistor T6 is connected with a third node N3, and a second electrode of the sixth transistor T6 is connected with a first node N1.

One end of the storage capacitor C1 is connected with the first node N1, and the other end of the storage capacitor C1 is connected with a first power supply line VDD.

A control electrode of the third transistor T3 is connected with the first node N1, a first electrode of the third transistor T3 is connected with a second node N2, and a second electrode of the third transistor T3 is connected with the third node N3.

A control electrode of the fifth transistor T5 is connected with the first scan signal line S1, a first electrode of the fifth transistor T5 is connected with a data signal line Data, and a second electrode of the fifth transistor T5 is connected with the second node N2.

FIG. 3 shows an exemplary structure of the compensation sub-circuit, the driving sub-circuit, and the writing sub-circuit. It is easy for those skilled in the art to understand that implementation modes of the compensation sub-circuit, the driving sub-circuit, and the writing sub-circuit are not limited thereto as long as respective functions of them can be achieved.

Figure 4:
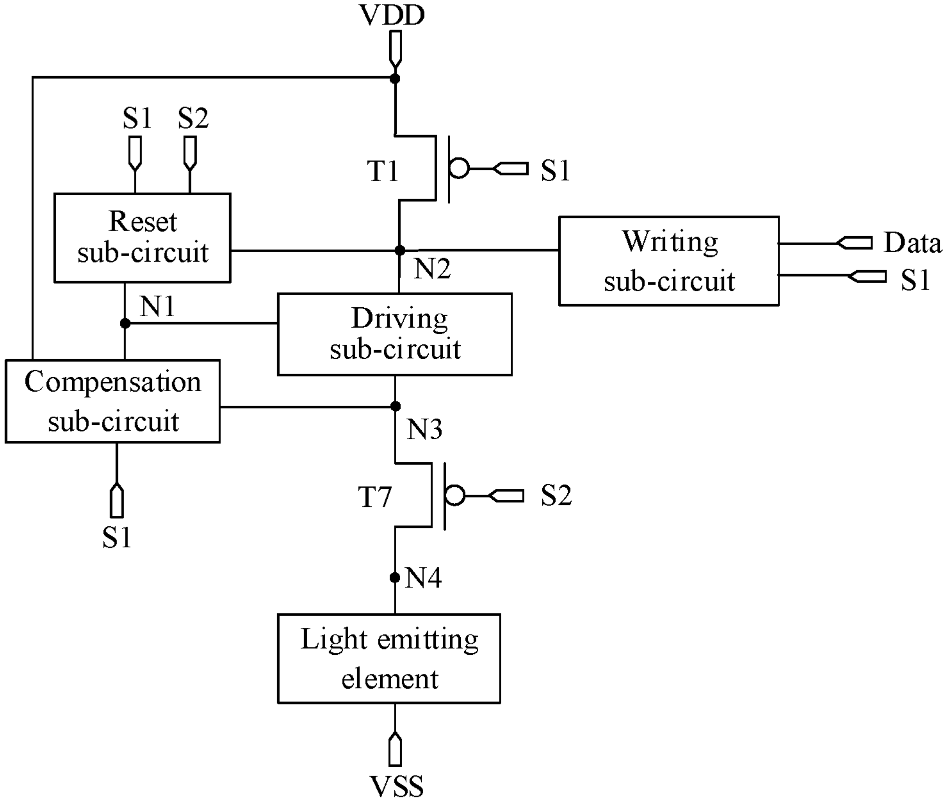
FIG. 4 is an equivalent circuit diagram of a first light-emitting control sub-circuit and a second light-emitting control sub-circuit according to an embodiment of the present disclosure.

In an exemplary embodiment, FIG. 4 is an equivalent circuit diagram of a first light-emitting control sub-circuit and a second light-emitting control sub-circuit according to an embodiment of the present disclosure. As shown in FIG.

4, the first light-emitting control sub-circuit provided in the embodiment of the present disclosure includes a first transistor T1 and the second light-emitting control sub-circuit includes a seventh transistor T7.

Among them, a control electrode of the first transistor T1 is connected with a first scan signal line S1, a first electrode of the first transistor T1 is connected with a first power supply line VDD, and a second electrode of the first transistor T1 is connected a second node N2.

A control electrode of the seventh transistor T7 is connected with a second scan signal line S2, a first electrode of the seventh transistor T7 is connected with a third node N3, and a second electrode of the seventh transistor T7 is connected with a fourth node N4.

FIG. 4 shows an exemplary structure of the first light-emitting control sub-circuit and the second light-emitting control sub-circuit. It is easy for those skilled in the art to understand that implementation modes of the first light-emitting control sub-circuit and the second light-emitting control sub-circuit are not limited thereto as long as respective functions of them can be achieved.

Figure 5A:
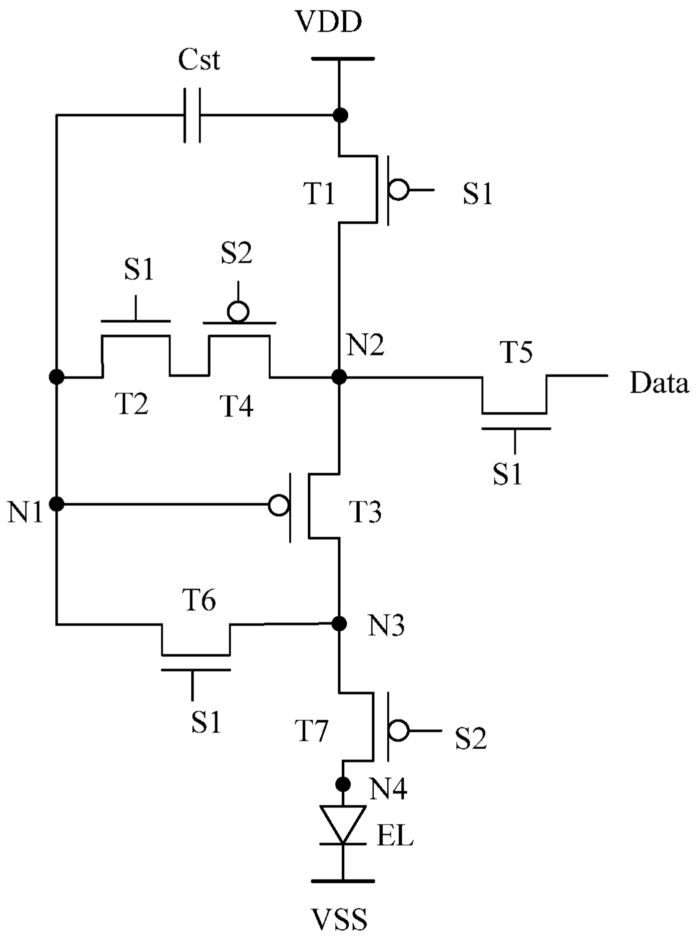
FIG. 5*a* and FIG. 5*b* are two equivalent circuit diagrams of a pixel circuit according to an embodiment of the present disclosure.

FIG. 5*a* is an equivalent circuit diagram of a pixel circuit according to an embodiment of the present disclosure. As shown in FIG. 5*a*, in the pixel circuit provided in the embodiment of the present disclosure, a reset sub-circuit includes a second transistor T2 and a fourth transistor T4, a compensation sub-circuit includes a sixth transistor T6 and a capacitor C1, a driving sub-circuit includes a third transistor T3, a writing sub-circuit includes a fifth transistor T5, a first light-emitting control sub-circuit includes a first transistor T1, and a second light-emitting control sub-circuit includes a seventh transistor T7.

A control electrode of the second transistor T2 is connected with a first scan signal line S1, a first electrode of the second transistor T2 is connected with a second electrode of the fourth transistor T4, and a second electrode of the second transistor T2 is connected with a first node N1.

A control electrode of the fourth transistor T4 is connected with a second scan signal line S2, a first electrode of the fourth transistor T4 is connected with a second node N2.

A control electrode of the sixth transistor T6 is connected with the first scan signal line S1. A first electrode of the second transistor T6 is connected with a third node N3. A second electrode of the sixth transistor T6 is connected with the first node N1.

One end of the storage capacitor C1 is connected with the first node N1, and the other end of the storage capacitor C1 is connected with a first power supply line VDD.

A control electrode of the third transistor T3 is connected with the first node N1. A first electrode of the third transistor T3 is connected with the second node N2. A second electrode of the third transistor T3 is connected with the third node N3.

A control electrode of the fifth transistor T5 is connected with the first scan signal line S1, a first electrode of the fifth transistor T5 is connected with a data signal line Data, and a second electrode of the fifth transistor T5 is connected with the second node N2.

A control electrode of the first transistor T1 is connected with the first scan signal line S1, a first electrode of the first transistor T1 is connected with the first power supply line VDD, and a second electrode of the first transistor T1 is connected the second node N2.

A control electrode of the seventh transistor T7 is connected with a second scan signal line S2, a first electrode of the seventh transistor T7 is connected with the third node N3, and a second electrode of the seventh transistor T7 is connected with a fourth node N4.

Figure 5B:
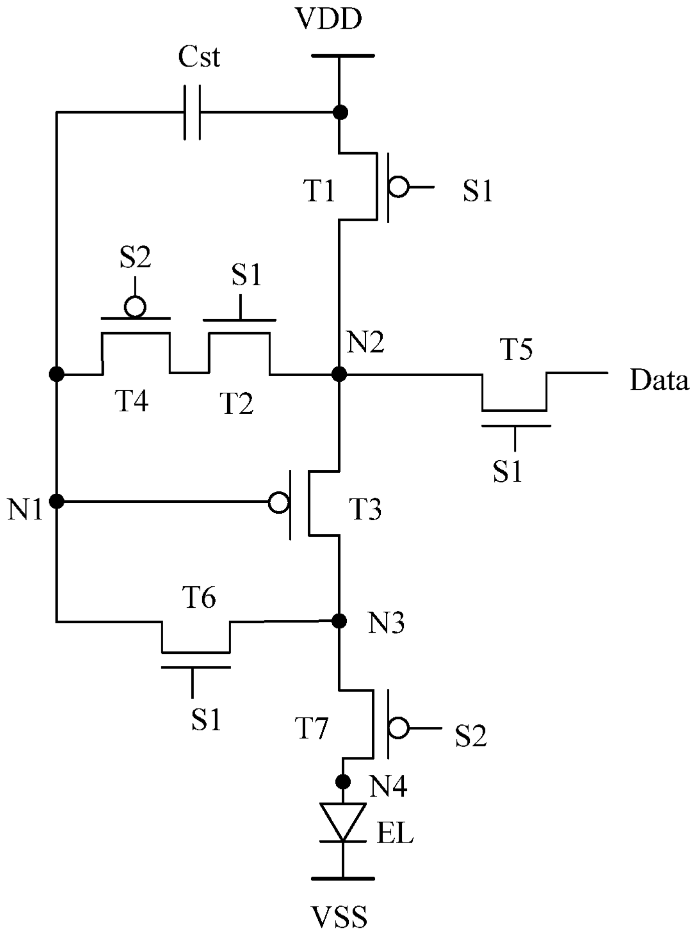

FIG. 5*b* is another equivalent circuit diagram of a pixel circuit according to an embodiment of the present disclosure. As shown in FIG. 5*b*, in the pixel circuit provided in the embodiment of the present disclosure, a reset sub-circuit includes a second transistor T2 and a fourth transistor T4, a compensation sub-circuit includes a sixth transistor T6 and a storage capacitor C1, a driving sub-circuit includes a third transistor T3, a writing sub-circuit includes a fifth transistor T5, a first light-emitting control sub-circuit includes a first transistor T1, and a second light-emitting control sub-circuit includes a seventh transistor T7.

A control electrode of the second transistor T2 is connected with a first scan signal line S1, and a first electrode of the second transistor T2 is connected with a second node N2, and a second electrode of the second transistor T2 is connected with a first electrode of the fourth transistor T4.

A control electrode of the fourth transistor T4 is connected with a second scan signal line S2, a first electrode of the fourth transistor T4 is connected with a first node N1.

A control electrode of the sixth transistor T6 is connected with the first scan signal line S1, a first electrode of the sixth transistor T6 is connected with a third node N3, and a second electrode of the second transistor T6 is connected with the first node N1.

One end of the storage capacitor C1 is connected with the first node N1, and the other end of the storage capacitor C1 is connected with a first power supply line VDD.

A control electrode of the third transistor T3 is connected with the first node N, a first electrode of the third transistor T3 is connected with the second node N2, and a second electrode of the third transistor T3 is connected with the third node N3.

A control electrode of the fifth transistor T5 is connected with the first scan signal line S1, a first electrode of the fifth transistor T5 is connected with a data signal line Data, and a second electrode of the fifth transistor T5 is connected with the second node N2.

A control electrode of the first transistor T1 is connected with the first scan signal line S1, a first electrode of the first transistor T1 is connected with the first power supply line VDD, and a second electrode of the first transistor T1 is connected the second node N2.

A control electrode of the seventh transistor T7 is connected with the second scan signal line S2, a first electrode of the seventh transistor T7 is connected with the third node N3, and a second electrode of the seventh transistor T7 is connected with a fourth node N4.

FIG. 5*a* and FIG. 5*b* show exemplary structures of the reset sub-circuit, the compensation sub-circuit, the driving sub-circuit, the writing sub-circuit, the first light-emitting control sub-circuit, and the second light-emitting control sub-circuit. It is easy for those skilled in the art to understand that implementation modes of the above sub-circuits are not limited thereto as long as respective functions of them can be achieved.

In an exemplary embodiment, the light-emitting element EL may be an Organic Light-emitting Diode (OLED) or a light-emitting diode of any other type.

In an exemplary embodiment, as shown in FIG. 5*a* and FIG. 5*b*, the first transistor T1, the third transistor T3, the fourth transistor T4, and the seventh transistor T7 are all P-type thin film transistors, and the second transistor T2, the fifth transistor T5, and the sixth transistor T6 are all N-type thin film transistors.

In an exemplary embodiment, the N-type thin film transistors may be Low Temperature Polysilicon (LTPS) Thin Film Transistors (TFT), and the P-type thin film transistors may be Indium Gallium Zinc Oxide (IGZO) thin film transistors. Or, the N-type thin film transistors may be IGZO thin film transistors and the P-type thin film transistors may be LTPS thin film transistors.

In an exemplary embodiment, the first transistor T1, the third transistor T3, the fourth transistor T4, and the seventh transistor T7 are all LTPS thin film transistors, and the second transistor T2, the fifth transistor T5, and the sixth transistor T6 are IGZO thin film transistors.

In this embodiment, compared with the Low Temperature Polysilicon thin film transistor a leakage current produced by the Indium Gallium Zinc Oxide thin film transistor is smaller. Therefore, by disposing the second transistor T2, the fifth transistor T5, and the sixth transistor T6 as Indium Gallium Zinc Oxide thin film transistors, a leakage of a control electrode of a driving transistor in a light-emitting stage may be significantly reduced, thereby improving a problem of flickering of a display panel at a low frequency and low brightness.

Figure 6:
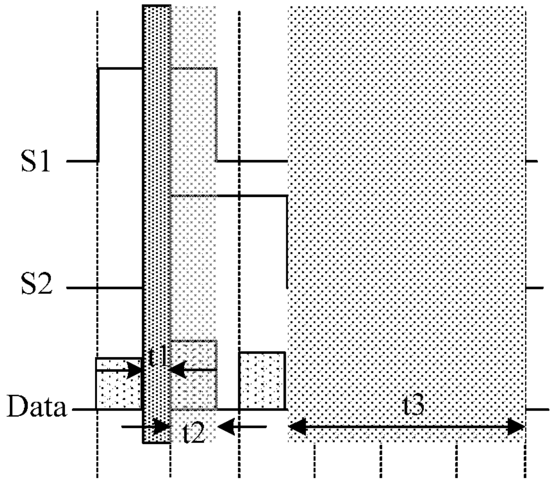
FIG. 6 is an operating timing diagram of a pixel circuit according to an embodiment of the present disclosure.

A working process of a pixel circuit within one frame cycle will be described below in detail with reference to the pixel circuit shown in FIG. 5 and the operating timing diagram shown in FIG. 6 by taking a case that all of the first transistor T1, the third transistor T3, the fourth transistor T4, and the seventh transistor T7 in the pixel circuit provided in the embodiment of the present disclosure are P-type thin film transistors and all of the second transistor T2, the fifth transistor T5, and the sixth transistor T6 are N-type thin film transistors as an example. As shown in FIG. 5*a* and FIG. 5*b*, the pixel circuit provided in the embodiment of the present disclosure includes seven transistor units (T1 to T7), one capacitor unit (C1), and three signal lines (VDD, VSS, and Data), wherein the first power supply line VDD continuously provides a high-level signal, the second power supply line VSS continuously provides a low-level signal, and the data signal line Data periodically provides a data voltage signal Vdata_H and a reset voltage signal Vdata_L. In an exemplary embodiment, the working process includes following stages.

In a first stage t1, referred to as a reset stage, a signal of the first scan signal line S1 is a high-level signal, a signal of the second scan signal line S2 is a low-level signal, and the data signal line Data outputs a reset voltage signal Vdata_L. The high-level signal of the first scan signal line S1 turns off the first transistor T1 and turns on the second transistor T2, the fifth transistor T5, and the sixth transistor T6, and the low-level signal of the second scan signal line S2 turns on the fourth transistor T4 and the seventh transistor T7. The fifth transistor T5, the fourth transistor T4, and the second transistor T2 are turned on so that the reset voltage signal Vdata_L of the data signal line Data is written to the first node N1, and the sixth transistor T6 and the seventh transistor T7 are turned on so that the reset voltage signal Vdata_L of the first node N1 is written to the fourth node N4. At this time, all of signals of the first node N1 and the fourth node N4 are the reset voltage signal provided by the data signal line Data. In this stage, the storage capacitor C1, an anode terminal voltage of a light-emitting element EL, and a gate voltage of the third transistor (i.e., a driving transistor) T3 are reset to complete initialization. Since the first transistor T1 is turned off, the light-emitting element EL does not emit light in this stage.

In a second stage t2, referred to as a data writing stage, all of signals of the first scan signal line S1 and the second scan signal line S2 are high-level signals, and the data signal line Data outputs a data voltage signal Vdata_H. In this stage, a second end (i.e., the first node N1) of the storage capacitor C1 is at a low level, so that the third transistor T3 is turned on. The high-level signals of the first scan signal line S1 and the second scan signal line S2 turn on the second transistor T2, the fifth transistor T5, and the sixth transistor T6, and turn off the first transistor T1, the fourth transistor T4, and the seventh transistor T7. The fifth transistor T5, the third transistor T3, and the sixth transistor T6 are turned on, so that the data voltage signal Vdata_H output by the data signal line Data is provided to the first node N1 through the second node N2, the turned-on third transistor T3, the third node N3, and the turned-on sixth transistor T6, the storage capacitor C1 is charged with a sum of the data voltage signal Vdata_H output by the data signal line Data and a threshold voltage Vth of the third transistor T3, and a voltage of the second end (the first node N1) of the storage capacitor C1 is Vdata_H+Vth. Since the first transistor T1 and the seventh transistor T7 are turned off, the light-emitting element EL does not emit light in this stage.

In a third stage t3, referred to as a light-emitting stage, all of the signals of the first scan signal line S1 and the second scan signal line S2 are low-level signals. The low-level signals of the first scan signal line S1 and the second scan signal line S2 turn on the first transistor T1, the fourth transistor T4, and the seventh transistor T7, and turn off the second transistor T2, the fifth transistor T5, and the sixth transistor T6. A power supply voltage output by the first power supply line VDD provides a driving voltage to a first electrode (i.e., the fourth node N4) of the light-emitting element EL through the turned-on first transistor T1, the third transistor T3, and the seventh transistor T7 to drive the light-emitting element to emit light.

In a driving process of the pixel circuit, a driving current flowing through the third transistor T3 (i.e., the driving transistor) is determined by a voltage difference between a gate electrode and first electrode of the third transistor T3. Since the voltage of the first node N1 is Vdata_H+Vth, the driving current of the third transistor T3 is as follows.

$$I=K*(Vgs-Vth)^2=K*[(V\text{data}\_H+Vth-Vdd)-Vth]^2=K*[(V\text{data}\_H-Vdd)]^2$$

Herein, I is the driving current flowing through the third transistor T3, i.e., a driving current for driving the light-emitting element EL, K is a constant, Vgs is the voltage difference between the gate electrode and first electrode of the third transistor T3, Vth is the threshold voltage of the third transistor T3, Vdata_H is the data voltage output by the data signal line Data, and Vdd is a power supply voltage output by the first power supply line VDD.

It can be seen from the above-mentioned formula that the current I flowing through the light-emitting element EL is unrelated to the threshold voltage Vth of the third transistor T3, so that an influence of the threshold voltage Vth of the third transistor T3 on the current I is eliminated, and uniformity of brightness is ensured.

Figure 7A:
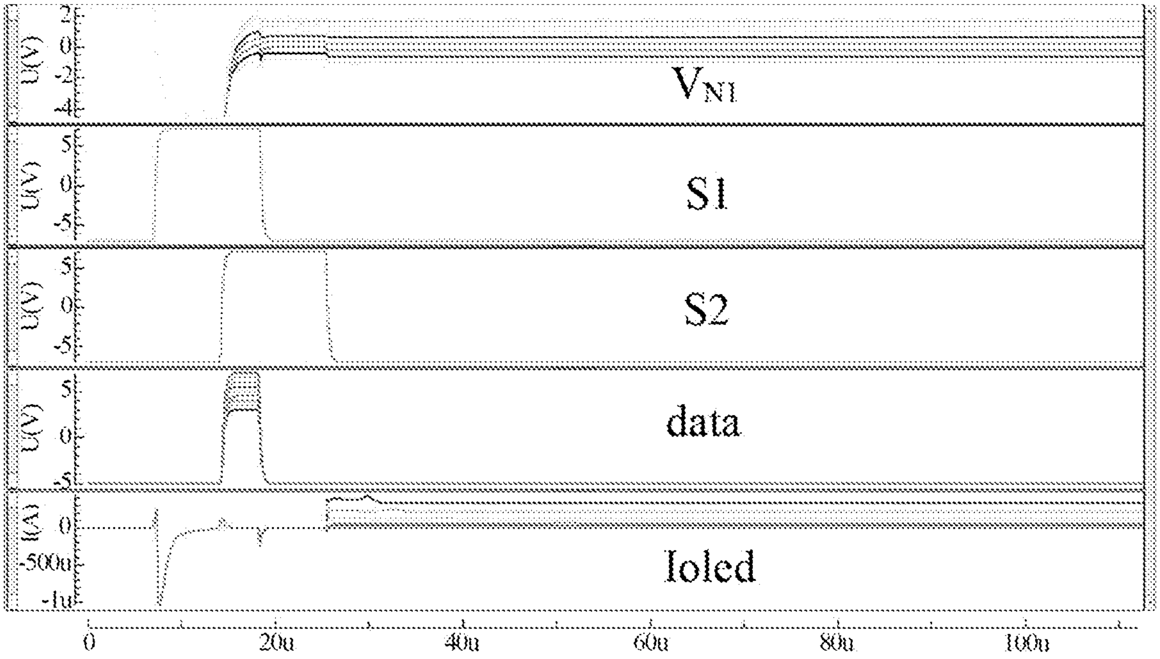
FIG. 7*a* is a signal simulation diagram of a pixel circuit under an operating timing shown in FIG. 6 according to an embodiment of the present disclosure.
Figure 7B:
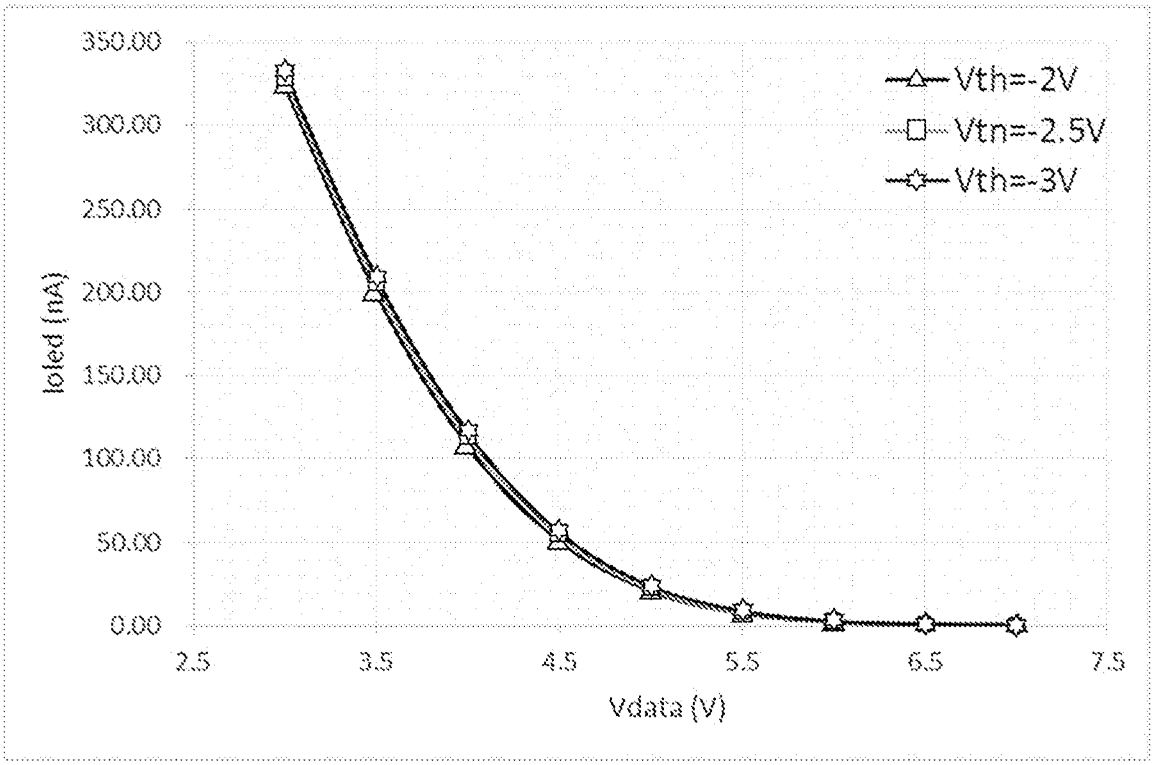
FIG. 7*b* is a schematic diagram of a situation in which a current flowing through a light-emitting element changes in a light-emitting stage in cases that a threshold voltage Vth is −2V, −2.5V, and −3V, and a data voltage is 3V to 7V in a pixel circuit according to an embodiment of the present disclosure.
Figure 7C:
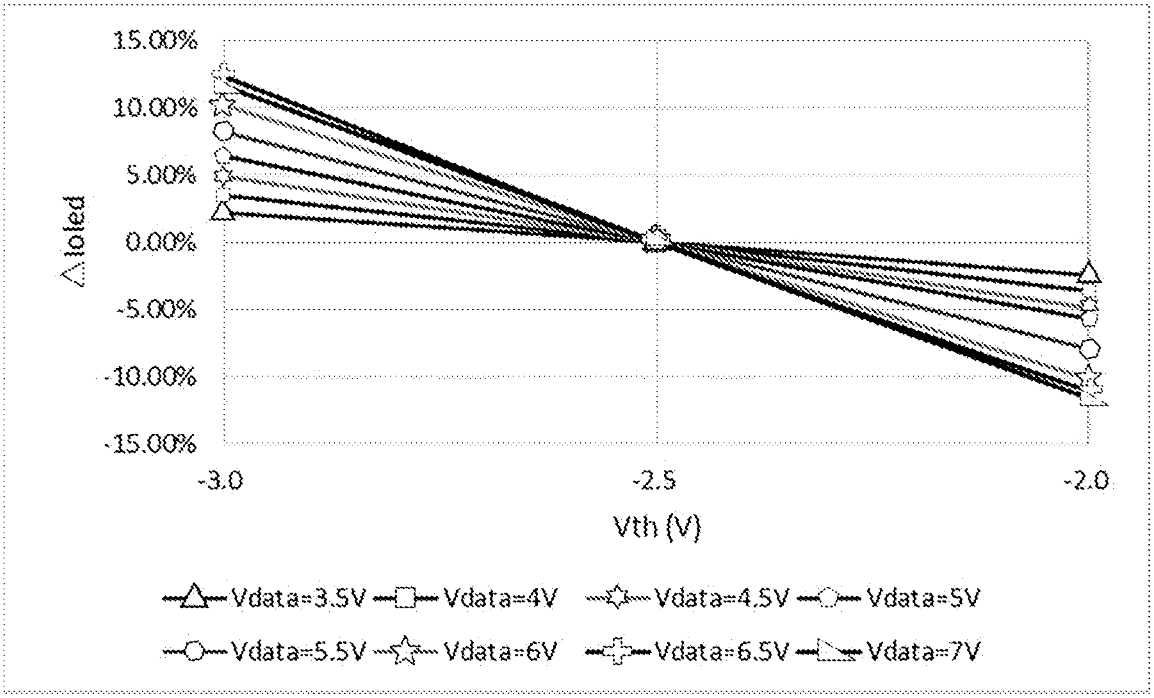
FIG. 7*c* is a schematic diagram of a situation in which a current flowing through a light-emitting element changes with a threshold voltage Vth in a light-emitting stage under different data voltages in a pixel circuit according to an embodiment of the present disclosure.

Due to influences of instability of processes, particles, and temperature in a preparation process of a semiconductor, it is often easy to cause a threshold voltage Vth of a Driving Thin Film Transistor (DTFT) to shift, which in turn causes magnitudes of currents flowing through a light-emitting diode to be uneven, resulting in uneven display (mura) of a screen. FIG. 7*a* is a signal simulation diagram of a pixel circuit under a corresponding timing sequence according to an embodiment of the present disclosure, and it may be seen from simulation that the pixel circuit may emit light normally. FIG. 7*b* shows a current Ioled flowing through a light-emitting element in a light-emitting stage in cases that a threshold voltage Vth is −2V, −2.5V, and −3V, and a voltage Vdata is 3V to 7V. Under different Vth, Ioled-Vdata curves of the pixel circuit almost coincide with each other, which indicates that the pixel circuit of the embodiment of the present disclosure achieves a compensation for the threshold voltage Vth. FIG. 7*c* is a schematic diagram of a situation in which a current Ioled flowing through a light-emitting element changes with a threshold voltage Vth of a driving thin film transistor in a light-emitting stage under different data voltages Vdata in the pixel circuit. When the data voltage Vdata is 4V, the current Ioled flowing through light-emitting element is about 110 nA in the light-emitting stage, and a change rate of Ioled with Vth is about 3.5%. When the data voltage Vdata is 5V, the current Ioled flowing through the light-emitting element is about 20 nA in the light-emitting stage, and the change rate of Ioled with Vth is about 6%. When the data voltage Vdata is 6.5V, the current Ioled flowing through the light-emitting element is about 0.8 nA in the light-emitting stage, and the change rate of Ioled with Vth is about 12%, which has a good Vth compensation effect.

Based on the above-mentioned operating timing, the pixel circuit eliminates residual positive charges of the light-emitting element EL after the light-emitting element EL emitted light last time, implements compensation for a gate voltage of a driving transistor, avoids an influence of drift of a threshold voltage of the driving transistor on a driving current of the light-emitting element EL, and improves uniformity of a displayed image and display quality of a display panel.

At present, display screens are developing towards narrow bezel. In order to enhance competitiveness of products, a display panel needs to reduce a bezel of a screen. In the pixel circuit according to the embodiment of the present disclosure, only one group of Gate Driver on Array (GOA) circuits are needed for driving the screen to work, thereby saving space of the bezel, achieving purposes of reducing the bezel of the screen and improving a resolution of the screen.

Generally, in a Low Temperature Polysilicon (LTPS) thin film transistor pixel circuit, a leakage current of a switching thin film transistor is about $10^{-13}$ A, so that brightness of an OLED device changes visibly to human eyes within one frame due to a leakage of a control electrode of a Driving Thin Film Transistor (DTFT) in a light-emitting stage, and flicker occurs, especially when an OLED screen works at a low frequency and low brightness, a flicker phenomenon will be more obvious, which is an urgent problem to be solved.

Figure 8:
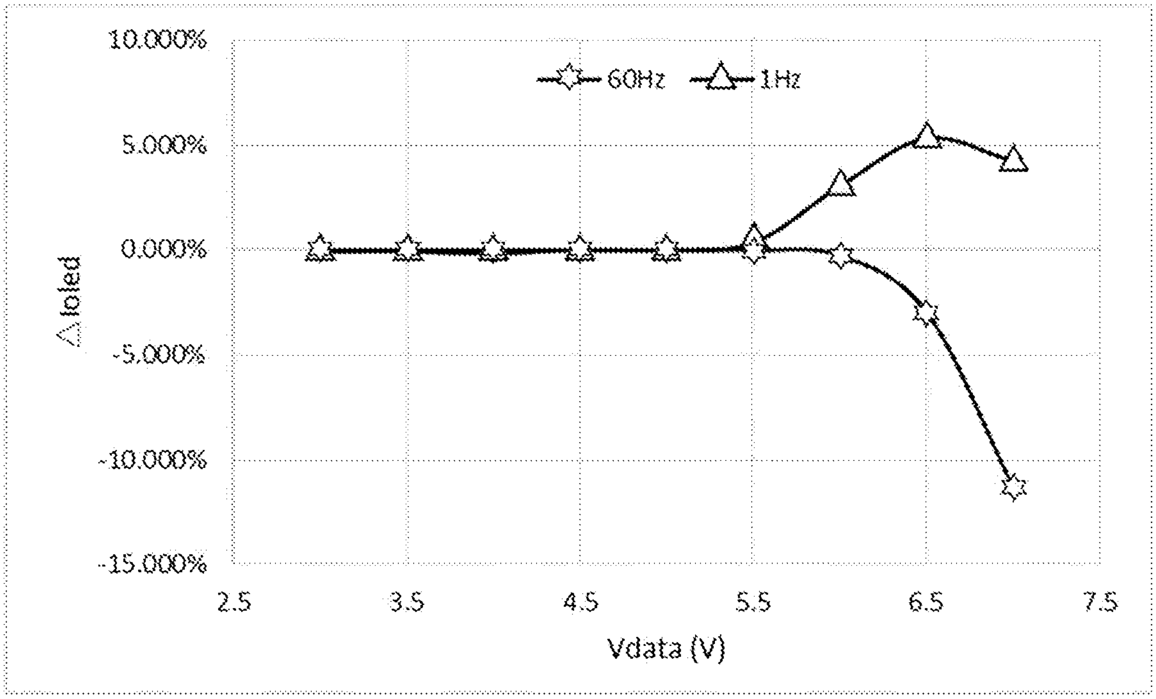
FIG. 8 is a schematic diagram of a situation in which a current flowing through a light-emitting element changes with a data voltage within one frame in cases that a refresh frequency is 60 Hz and 1 Hz in a pixel circuit according to an embodiment of the present disclosure.

In the pixel circuit of the embodiment of the present disclosure, all of switching transistors (T2, T5, and T6) connected with the Driving Thin Film Transistor are Indium Gallium Zinc Oxide thin film transistors, and a leakage current thereof may usually reach $10^{-16}$ A, and the switching transistors are connected with a gate of the DTFT as a switching TFT of the pixel circuit, the leakage of the control electrode of the DTFT in the light-emitting stage may be effectively reduced, thus improving a problem of flickering of the OLED screen under a low frequency and low brightness. As may be seen from FIG. 8, when $V_{data}$ is less than 5.5V ($I_{oled}$ is greater than 8.6 nA), a change rate of $I_{oled}$ within one frame is less than 0.35% in cases of 60 Hz and 1 Hz. When $V_{data}$ is greater than 5.5V, the change rate of $I_{oled}$ within one frame increases. In a case of 60 Hz, when $V_{data}$ is 7V ($I_{oled}$=0.47 nA), a maximum change rate of $I_{oled}$ within one frame is −11.3%. In a case of 1 Hz, when $V_{data}$ is 6.5V ($I_{oled}$=0.9 nA), a maximum change rate of $I_{oled}$ within one frame is 5.3%. Overall, the change rate of $I_{oled}$ at low brightness of 1 Hz is better than that at 60 Hz, indicating that the pixel circuit can improve a problem of flickering of screen under a low frequency and low brightness.

Figure 9:
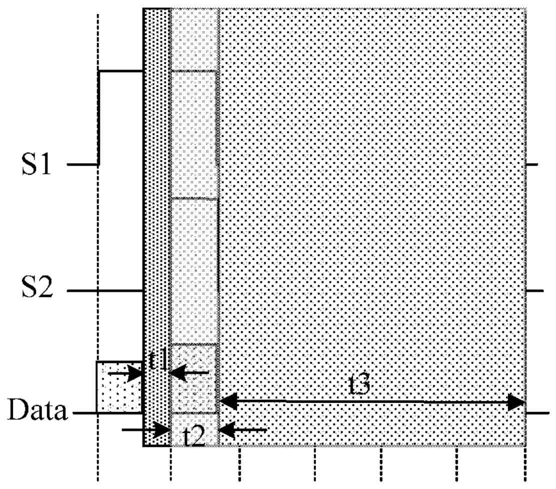
FIG. 9 is another operating timing diagram of a pixel circuit according to an embodiment of the present disclosure.

In other exemplary embodiments, as shown in FIG. 9, two groups of scan signals provided by a first scan signal line S1 and a second scan signal line S2 may be output by different GOA circuits. As shown in FIG. 9, a working process thereof includes following stages.

In a first stage t1, referred to as a reset stage, a signal of the first scan signal line S1 is a high-level signal, a signal of the second scan signal line S2 is a low-level signal, and the data signal line Data outputs a reset voltage signal Vdata_L. The high-level signal of the first scan signal line S1 turns off the first transistor T1 and turns on the second transistor T2, the fifth transistor T5, and the sixth transistor T6, and the low-level signal of the second scan signal line S2 turns on the fourth transistor T4 and the seventh transistor T7. The fifth transistor T5, the fourth transistor T4, and the second transistor T2 are turned on so that the reset voltage signal Vdata_L of the data signal line Data is written to the first node N1, and the sixth transistor T6 and the seventh transistor T7 are turned on so that the reset voltage signal Vdata_L of the first node N1 is written to the fourth node N4. At this time, all of signals of the first node N1 and the fourth node N4 are the reset voltage signal Vdata_L provided by the data signal line Data. In this stage, the storage capacitor C1, an anode terminal voltage of the light-emitting element EL and a gate voltage of the third transistor (i.e., the driving transistor) T3 are reset to complete initialization. Since the first transistor T1 is turned off, the light-emitting element EL does not emit light in this stage.

In a second stage t2, referred to as a data writing stage, all of signals of the first scan signal line S1 and the second scan signal line S2 are high-level signals, and the data signal line Data outputs a data voltage signal Vdata_H. In this stage, the second end (i.e., the first node N1) of the storage capacitor C1 is at a low level, so that the third transistor T3 is turned on. The high-level signals of the first scan signal line S1 and the second scan signal line S2 turn on the second transistor T2, the fifth transistor T5, and the sixth transistor T6, and turn off the first transistor T1, the fourth transistor T4, and the seventh transistor T7. The fifth transistor T5, the third transistor T3, and the sixth transistor T6 are turned on so that the data voltage signal Vdata_H output by the data signal line Data is provided to the first node N1 through the second node N2, the turned-on third transistor T3, the third node N3, and the turned-on sixth transistor T6, the storage capacitor C1 is charged with a sum of the data voltage signal Vdata_H output by the data signal line Data and a threshold voltage Vth of the third transistor T3, and a voltage of the second end (the first node N1) of the storage capacitor C1 is Vdata_H+Vth. Since the first transistor T1 and the seventh transistor T7 are turned off, the light-emitting element EL does not emit light in this stage.

In a third stage t3, referred to as a light-emitting stage, the signals of the first scan signal line S1 and the second scan signal line S2 are low-level signals. The low-level signals of the first scan signal line S1 and the second scan signal line S2 turn on the first transistor T1, the fourth transistor T4, and the seventh transistor T7, and turn off the second transistor T2, the fifth transistor T5, and the sixth transistor T6. A power supply voltage output by the first power supply line VDD provides a driving voltage to a first electrode (i.e., the fourth node N4) of the light-emitting element EL through the turned-on first transistor T1, the third transistor T3, and the seventh transistor T7 to drive the light-emitting element EL to emit light.

Figure 10:
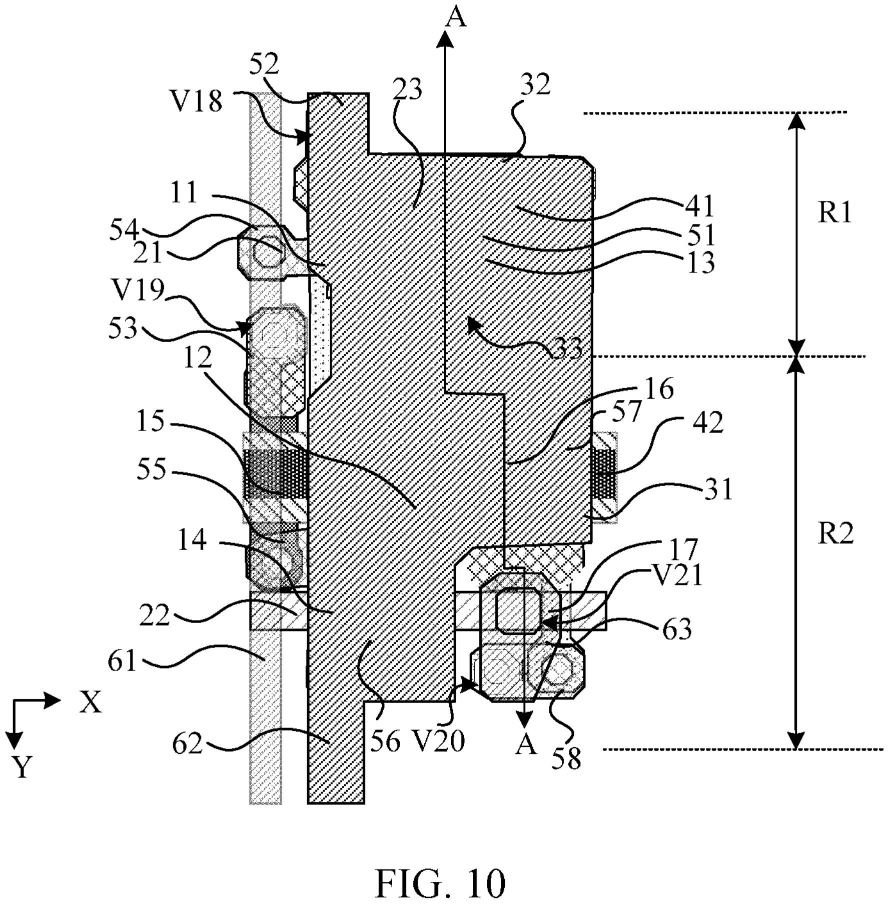
FIG. 10 is a schematic diagram of a planar structure of a pixel circuit according to an embodiment of the present disclosure.
Figure 11:
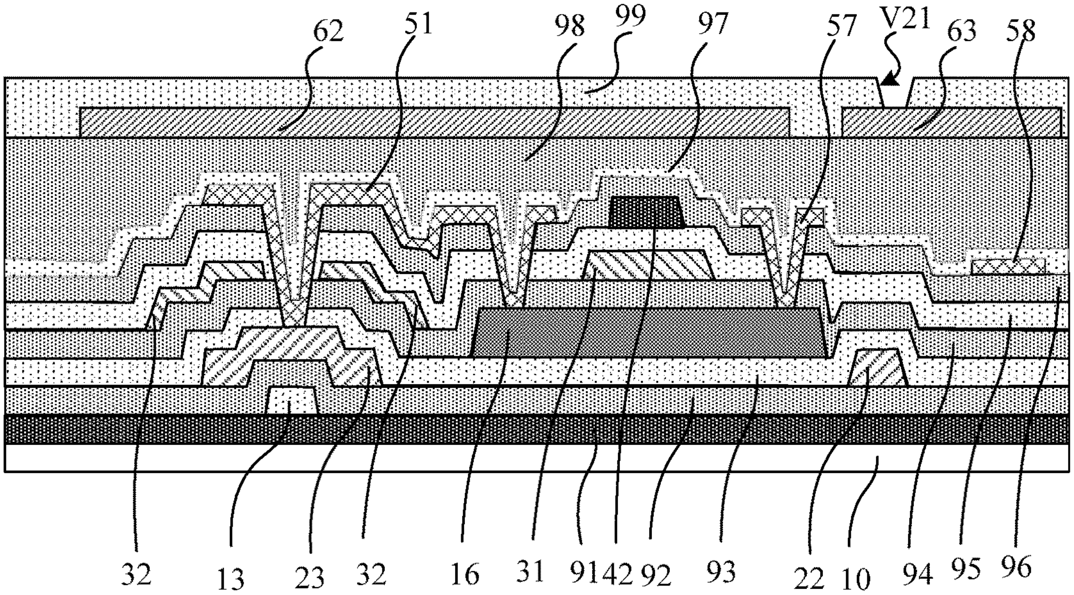
FIG. 11 is a sectional view taken along an A-A direction in FIG. 10.

In an exemplary embodiment, as shown in FIG. 10 and FIG. 11, FIG. 11 is a sectional view along an A-A direction in FIG. 10, and the pixel circuit includes a base substrate 10, and a first semiconductor layer, a first conductive layer, a second semiconductor layer, a second conductive layer, a third conductive layer, a fourth conductive layer, and a fifth conductive layer which are stacked on the base substrate 10.

The first semiconductor layer includes an active layer of at least one polysilicon transistor, the first conductive layer includes a second scan signal line 22 and a first electrode plate 23 of a storage capacitor, and there is an overlapping region between an orthographic projection of the second scan signal line 22 on the base substrate and an orthographic projection of the active layer of the polysilicon transistor(s) on the base substrate 10.

The second semiconductor layer includes an active layer of at least one oxide transistor, the second conductive layer includes a second electrode plate 32 of the storage capacitor and a first scan signal line 31, and the third conductive layer includes a second auxiliary signal line 42, wherein there is an overlapping region between an orthographic projection of the each of first scan signal line 31 on the base substrate 10 and the second auxiliary signal line 42 on the base substrate 10, and an orthographic projection of the active layer of the oxide transistor(s) on the base substrate 10.

The fourth conductive layer includes first electrodes and second electrodes of multiple polysilicon transistors and first electrodes and second electrodes of multiple oxide transistors, and the fifth conductive layer includes a data signal line and a first power supply line.

In an exemplary embodiment, the polysilicon transistors includes a first transistor T1, a third transistor T3, a fourth transistor T4, and a seventh transistor T7, and the oxide transistors includes a second transistor T2, a fifth transistor T5, and a sixth transistor T6.

In an exemplary embodiment, the pixel circuit includes a first region R1 and a second region R2.

The first transistor T1, the third transistor T3, and the storage capacitor C1 are disposed in the first region, and the second transistor T2, the fourth transistor T4 to the seventh transistor T7, the first scan signal line 31, and the second scan signal line 22 are disposed in the second region.

A structure of a display substrate according to an embodiment of the present disclosure is exemplarily described below through a preparation process of the display substrate. A "patterning process" mentioned in the present disclosure includes treatments such as film layer deposition, photoresist coating, mask exposure, development, etching, photoresist stripping, etc. The deposition may be any one or more of sputtering, evaporation, and chemical vapor deposition. The coating may be any one or more of spray coating and spin coating. The etching may be any one or more of dry etching and wet etching. A "thin film" refers to a thin film layer prepared from a material on a base substrate through a process of deposition or coating. If a patterning process is not needed by a "thin film" throughout a whole preparation process, the "thin film" may also be referred to as a "layer". When a patterning process is also needed by a "thin film" throughout a whole preparation process, the thin film is referred to as a "thin film" before the patterning process and referred to as a "layer" after the patterning process. The "layer" after the patterning process includes at least one "pattern". "A and B are disposed in a same layer" mentioned in the present disclosure refers to that A and B are simultaneously formed through a same patterning process. "An orthographic projection of A contains an orthographic projection of B" refers to that the orthographic projection of B falls in a range of the orthographic projection of A or the orthographic projection of A covers the orthographic projection of B.

In some exemplary embodiments, the preparation process of the display substrate shown in FIG. 4 may include following steps.

In an exemplary embodiment, the preparation process of the display substrate may include following operations.

(11) A pattern of a first semiconductor layer is formed. In an exemplary embodiment, forming the pattern of the first semiconductor layer may include: sequentially depositing a first insulation thin film and a first active layer thin film on a base substrate 10; coating a layer of photoresist on the first active layer thin film, exposing and developing the photoresist using a single tone mask, forming an unexposed region with remaining photoresist at a position of a pattern of a first active layer and forming a fully exposed region without photoresist at another position; and etching the first active layer thin film in the fully exposed region and stripping the remaining photoresist to form a first insulation layer 91 and the pattern of the first semiconductor layer. The first insulation layer 91 is used for blocking an influence of ions in the base substrate on a thin film transistor, the first insulation layer 91 may be a composite thin film of silicon nitride (SiNx), silicon oxide (SiOx), or SiNx/SiOx, and the first active layer thin film may be made of a silicon material, which includes amorphous silicon and polysilicon. The first active layer thin film may also be made of amorphous Silicon (a-Si), and polysilicon may be formed by crystallization or laser annealing, as shown in FIGS. 12*a* and 12*b*, wherein FIG. 12*b* is a sectional view taken along an A-A direction in FIG. 12*a*.

Figure 12A:
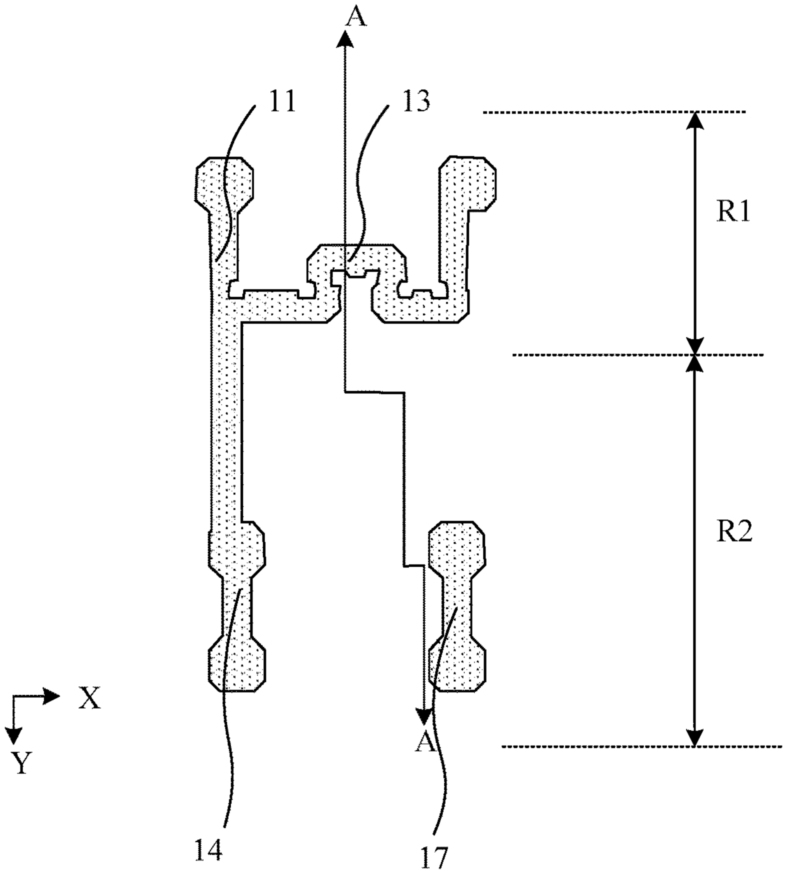
FIG. 12*a* is a schematic diagram of a pixel circuit after a pattern of a first semiconductor layer is formed according to the present disclosure.
Figure 12B:
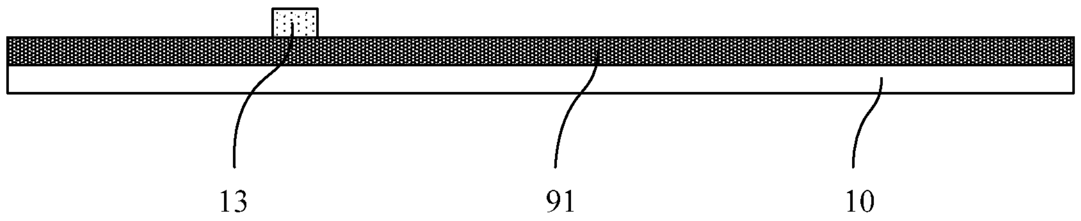
FIG. 12*b* is a sectional view taken along an A-A direction in FIG. 12*a*.

As shown in FIG. 12*a*, the first semiconductor layer of each sub-pixel may include a first active layer 11 of the first transistor T1, a third active layer 13 of the third transistor T3, a fourth active layer 14 of the fourth transistor T4, and a seventh active layer 17 of the seventh transistor T7, wherein the first active layer 11, the third active layer 13, and the fourth active layer 14 are of a mutual-connected integral structure.

In an exemplary embodiment, the first active layer 11 of the first transistor T1 and the third active layer 13 of the third transistor T3 are disposed in the first region R1, the fourth active layer 14 of the fourth transistor T4 and the seventh active layer 17 of the seventh transistor T7 are disposed in the second region R2. Both the fourth active layer 14 and the seventh active layer 17 extend along a second direction Y. In an exemplary embodiment, a distance from the fourth active layer 14 to a boundary line of the first region R1 and the second region R2 is equal to a distance from the seventh active layer 17 to the boundary line of the first region R1 and the second region R2.

In an exemplary embodiment, the third active layer 13 may be in a shape of "Q", the first active layer 11 may be in a shape of a "1", and the fourth active layer 14 and the seventh active layer 17 may be in a shape of an "I".

In an exemplary embodiment, an active layer of each transistor may include a first region, a second region, and a channel region located between the first region and the second region. In an exemplary embodiment, a second region 11-2 of the first active layer 11 also serves as a first region 13-1 of the third active layer 13, i.e., the second region 11-2 of the first active layer 11 and the first region 13-1 of the third active layer 13 are connected with each other. A first region 11-1 of the first active layer 11, a second region 13-2 of the third active layer 13, a first region 14-1 of the fourth active layer 14, a second region 14-2 of the fourth active layer 14, a first region 17-1 of the seventh active layer 17, and a second region 17-2 of the seventh active layer 17 are disposed separately.

In an exemplary embodiment, the first semiconductor layer may be made of polysilicon (p-Si), that is, the first transistor T1, the third transistor T3, the fourth transistor T4, and the seventh transistor T7 are LTPS thin film transistors.

As shown in FIG. 12*b*, after this process, the display substrate includes the first insulation layer 91 disposed on the base substrate 10 and the first semiconductor layer disposed on the first insulation layer 91. The first semiconductor layer may include the first active layer 11 of the first transistor T1, the third active layer 13 of the third transistor T3, the fourth active layer 14 of the fourth transistor T4, and the seventh active layer 17 of the seventh transistor T7.

Figure 13A:
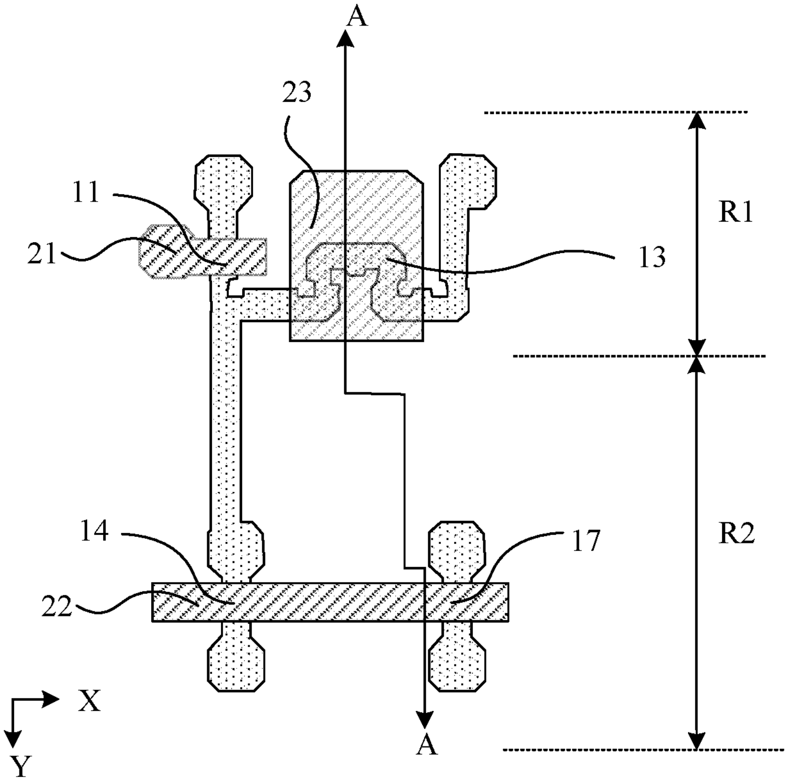
FIG. 13*a* is a schematic diagram of a pixel circuit after a pattern of a first conductive layer is formed according to the present disclosure.
Figure 13B:
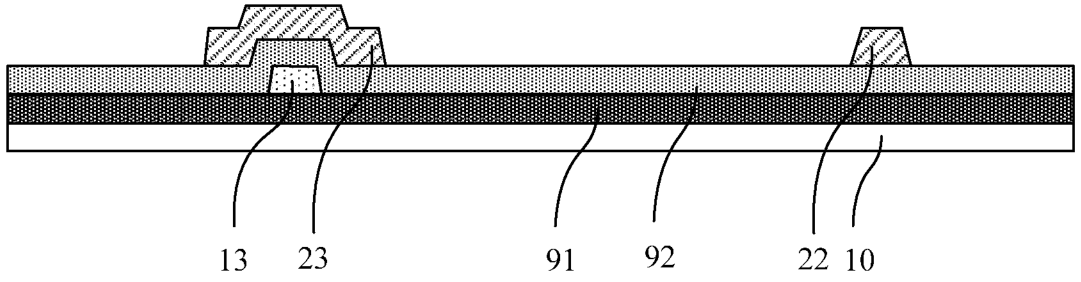
FIG. 13*b* is a sectional view taken along an A-A direction in FIG. 13*a*.

(12) A pattern of a first conductive layer is formed. In an exemplary embodiment, forming the pattern of the first conductive layer may include: sequentially depositing a second insulation thin film and a first metal thin film on the base substrate on which the above-mentioned patterns are formed, and patterning the first metal thin film through a patterning process to form a second insulation layer that covers the pattern of the first semiconductor layer and form the pattern of the first conductive layer disposed on the second insulation layer. The pattern of the first conductive layer at least includes a first gate block 21, a second scan signal line 22, and a first electrode plate 23 of the storage capacitor, as shown in FIG. 13*a* and FIG. 13*b*, and FIG. 13*b* is a sectional view along an A-A direction in FIG. 13*a*. In an exemplary embodiment, the first conductive layer may be called a first gate metal (GATE1) layer.

In an exemplary embodiment, the first gate block 21 and the first electrode plate 23 of the storage capacitor are disposed in the first region R1. The second scan signal line 22 extends along a first direction X and is disposed in the second region R2.

In an exemplary embodiment, there is an overlapping region between an orthographic projection of the first gate block 21 on the base substrate 10 and an orthographic projection of the first active layer 11 of the first transistor T1 on the base substrate 10. A region where the first gate block 21 is overlapped with the first active layer 11 of the first transistor T1 serves as a gate electrode of the first transistor T1.

In an exemplary embodiment, the first electrode plate 23 may be in a shape of a rectangle, and corners of the rectangle may be provided with chamfers. There is an overlapping region between an orthographic projection of the first electrode plate 23 on the base substrate 10 and an orthographic projection of the third active layer of the third transistor T3 on the base substrate 10. In an exemplary embodiment, the first electrode plate 23 also serves as a gate electrode of the third transistor T3 and a region where the third active layer of the third transistor T3 is overlapped with the first electrode plate 23 serves as a channel region of the third transistor T3. One end of the channel region is connected with a first region of the third active layer and the other end of the channel region is connected with a second region of the third active layer.

A region where the second scan signal line 22 is overlapped with the fourth active layer of the fourth transistor T4 serves as a gate electrode of the fourth transistor T4. A region where the second scan signal line 22 is overlapped with the seventh active layer 17 of the seventh transistor T7 serves as a gate electrode of the seventh transistor T7.

In an exemplary embodiment, after the pattern of the first conductive layer is formed, the semiconductor layer may be subjected to a conductive treatment by using the first conductive layer as a shield. The semiconductor layer in a region which is shielded by the first conductive layer forms channel regions of the first transistor T1, the third transistor T3, the fourth transistor T4, and the seventh transistor T7, and the semiconductor layer in a region which is not shielded by the first conductive layer is made to be conductive, that is, first and second regions of the first active layer, the third active layer, the fourth active layer, and the seventh active layer are all made to be conductive.

As shown in FIG. 13*b*, after this process, the display substrate includes the first insulation layer 91 disposed on the base substrate 10, the first semiconductor layer disposed on the first insulation layer 91, the second insulation layer 92 covering the first semiconductor layer, and the first conductive layer disposed on the second insulation layer 92. The first conductive layer may include the first gate block 21, the second scan signal line 22, and the first electrode plate 23 of the storage capacitor.

(13) A pattern of a second semiconductor layer is formed. In an exemplary embodiment, forming the pattern of the second semiconductor layer may include: sequentially depositing a third insulation thin film and a second semiconductor thin film on the base substrate on which the aforementioned patterns are formed, and patterning the second semiconductor thin film through a patterning process to form a third insulation layer 93 covering the base substrate 10 and the second semiconductor layer disposed on the third insulation layer 93, as shown in FIGS. 14*a* and 14*b*, wherein FIG. 14*b* is a sectional view taken along an A-A direction in FIG. 14*a*.

Figure 14A:
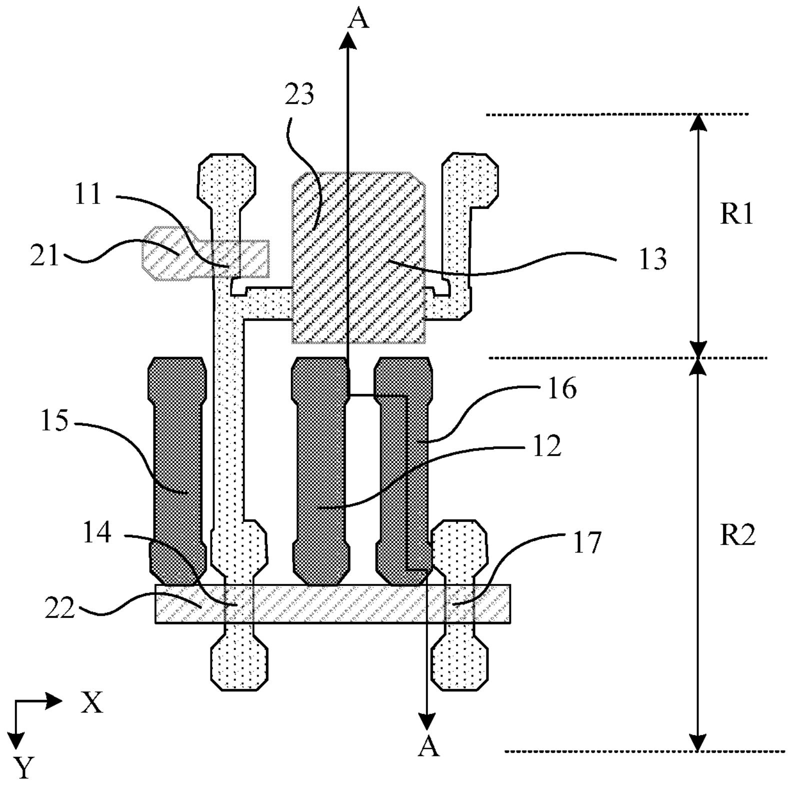
FIG. 14*a* is a schematic diagram of a pixel circuit after a pattern of a second semiconductor layer is formed according to the present disclosure.

As shown in FIG. 14*a*, the second semiconductor layer of each sub-pixel may include a fifth active layer 15 of the fifth transistor T5, a second active layer 12 of the second transistor T2, and a sixth active layer 16 of the sixth transistor T6. In an exemplary embodiment, the fifth active layer 15, the second active layer 12, and the sixth active layer 16 all extend along a second direction Y and are all disposed within the second region R2. In an exemplary embodiment, the fifth active layer 15, the second active layer 12, and the sixth active layer 16 may each be in a shape of an "I" and are all located on a side of the second scan signal line 22 close to the first region R1. In an exemplary embodiment, edges of the fifth active layer 15, the second active layer 12, and the sixth active layer 16 adjacent to the first region R1 are overlapped with an orthographic projection of the boundary line of the first region R1 and the second region R2 on the base substrate 10.

In an exemplary embodiment, the second semiconductor layer may be made of an oxide, that is, the fifth transistor, the second transistor, and the sixth transistor may be oxide thin film transistors.

Figure 14B:
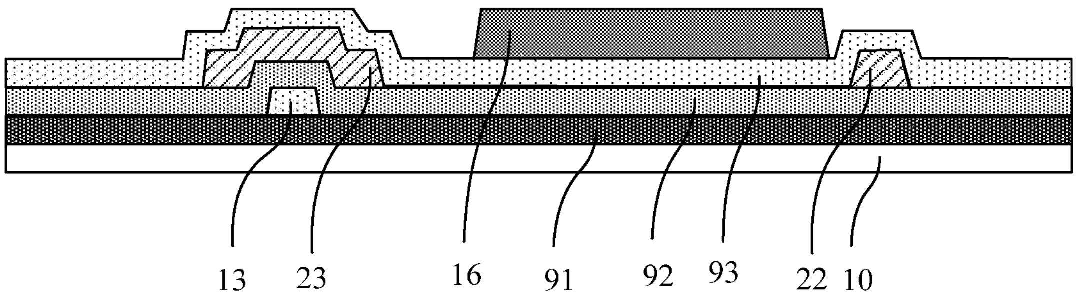
FIG. 14*b* is a sectional view taken along an A-A direction in FIG. 14*a*.

As shown in FIG. 14*b*, in a plane perpendicular to the base substrate, the first insulation layer 91 is disposed on the base substrate 10, the first semiconductor layer is disposed on the first insulation layer 91, the second insulation layer 92 covers the first semiconductor layer, the first conductive layer is disposed on the second insulation layer 92, the third insulation layer 93 covers the first conductive layer, the second semiconductor layer is disposed on the third insulation layer 93, and the second semiconductor layer at least includes the fifth active layer 15, the second active layer 12, and the six active layer 16.

Figure 15A:
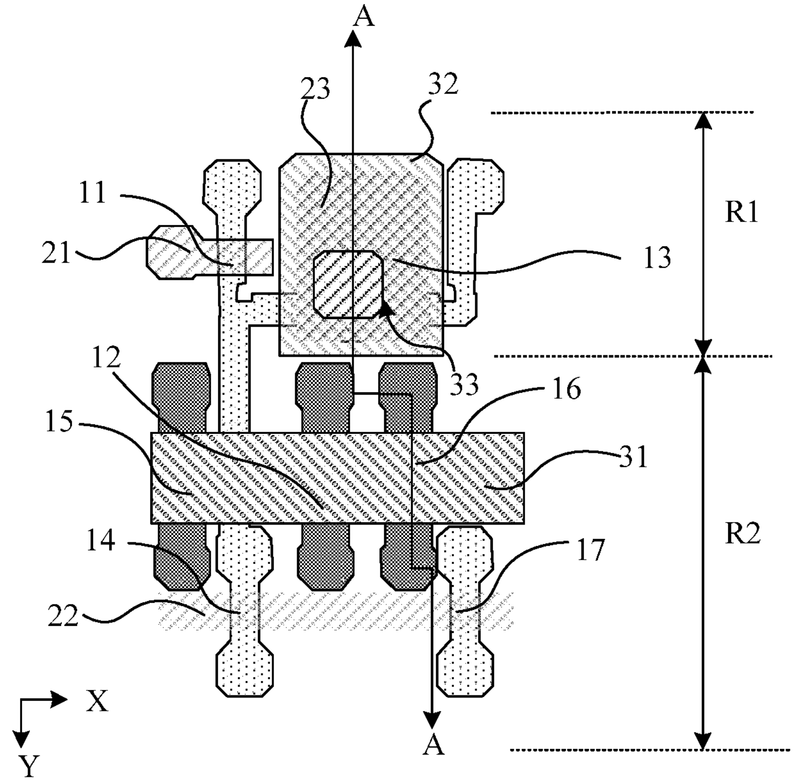
FIG. 15*a* is a schematic diagram of a pixel circuit after a pattern of a second conductive layer is formed according to the present disclosure.
Figure 15B:
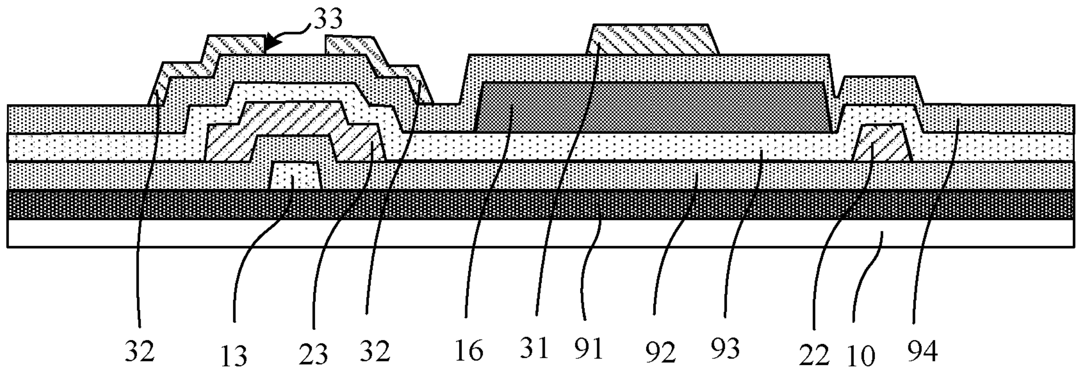
FIG. 15*b* is a sectional view taken along an A-A direction in FIG. 15*a*.

(14) A pattern of a second conductive layer is formed. In an exemplary embodiment, forming the pattern of the second conductive layer may include: sequentially depositing a fourth insulation thin film and a second metal thin film on the base substrate on which the above-mentioned patterns are formed, and the second metal thin film is patterned through a patterning process to form a fourth insulation layer 94 that covers the first conductive layer and form a pattern of a second conductive layer disposed on the fourth insulation layer 94. The pattern of the second conductive layer at least includes: a first scan signal line 31 and a second electrode plate 32 of the storage capacitor, as shown in FIG. 15*a* and FIG. 15*b*, and FIG. 15*b* is a sectional view along an A-A direction in FIG. 15*a*. In an exemplary embodiment, the second conductive layer may be called a second gate metal (GATE 2) layer.

As shown in FIG. 15*a*, in an exemplary embodiment, the first scan signal line 31 extending along the first direction X is disposed in the second region R2, and is located on a side of the second scan signal line 22 close to the first region R1. There is an overlapping region between an orthographic projection of the first scan signal line 31 on the base substrate 10 and an orthographic projection of the second active layer 12 of the second transistor T2 on the base substrate 10. A region where the first scan signal line 31 is overlapped with the second active layer 12 of the second transistor T2 serves as a gate electrode of the second transistor T2. There is an overlapping region between the orthographic projection of the first scan signal line 31 on the base substrate 10 and an orthographic projection of the fifth active layer 15 of the fifth transistor T5 on the base substrate 10. A region where the first scan signal line 31 is overlapped with the fifth active layer 15 of the fifth transistor T5 serves as a gate electrode of the fifth transistor T5. There is an overlapping region between the orthographic projection of the first scan signal line 31 on the base substrate 10 and an orthographic projection of the sixth active layer 16 of the sixth transistor T6 on the base substrate 10. A region where the first scan signal line 31 is overlapped with the sixth active layer 16 of the sixth transistor T6 serves as a gate electrode of the sixth transistor T6.

In an exemplary embodiment, a contour of the second electrode plate 32 may be in a shape of a rectangle, and corners of the rectangle may be provided with chamfers. There is an overlapping region between an orthographic projection of the second electrode plate 32 on the base substrate 10 and an orthographic projection of the first electrode plate 23 on the base substrate 10. The second electrode plate 32 is provided with an opening 33, and the opening 33 may be located in a middle of the second electrode plate 32. The opening 33 may be in a shape of a rectangle, so that the second electrode plate 32 forms an annular structure. The opening 33 exposes the fourth insulation layer 94 covering the first electrode plate 23, and the orthographic projection of the first electrode plate 23 on the base substrate 10 contains an orthographic projection of the opening 33 on the base substrate 10. In an exemplary embodiment, the opening 33 is configured to accommodate a first via subsequently formed, the first via is located in the opening 33 and exposes the first electrode plate 23, so that a second electrode of the second transistor T2, a first electrode of the sixth transistor T6, and a gate electrode of the third transistor T3 are connected with the first electrode plate 23.

In an exemplary embodiment, an orthographic projection of an edge of the second electrode plate 32 adjacent to the second region R2 on the base substrate 10 is overlapped with an orthographic projection of the boundary line of the first region R1 and the second region R2 on the base substrate 10.

As shown in FIG. 15*b*, in a plane perpendicular to the base substrate 10, the first insulation layer 91 is disposed on the base substrate 10. The first semiconductor layer is disposed on the first insulation layer 91. The second insulation layer 92 covers the first semiconductor layer. The first conductive layer is disposed on the second insulation layer 92. The third insulation layer 93 covers the first conductive layer. The second semiconductor layer is disposed on the third insulation layer 93. The fourth insulation layer 94 covers the second semiconductor layer. The second conductive layer is disposed on the fourth insulation layer 94. The second conductive layer at least includes the first scan signal line 31 and the second electrode plate 32 of the storage capacitor.

(15) A pattern of a third conductive layer is formed. In an exemplary embodiment, forming the pattern of the third conductive layer may include: sequentially depositing a fifth insulation thin film and a third metal thin film on the base substrate on which the aforementioned patterns are formed, and patterning the fifth insulation thin film and the third metal thin film respectively through a patterning process to form a fifth insulation layer 95 disposed on the second conductive layer and a pattern of a third conductive layer disposed on the fifth insulation layer 95. The pattern of the third conductive layer at least include a first auxiliary signal line 41 and a second auxiliary signal line 42, as shown in FIGS. 13*a* and 13*b*, and FIG. 13*b* is a sectional view taken along an A-A direction in FIG. 13*a*. In an exemplary embodiment, a third conductive layer may be referred to as a third gate metal (GATE3) layer.

Figure 16A:
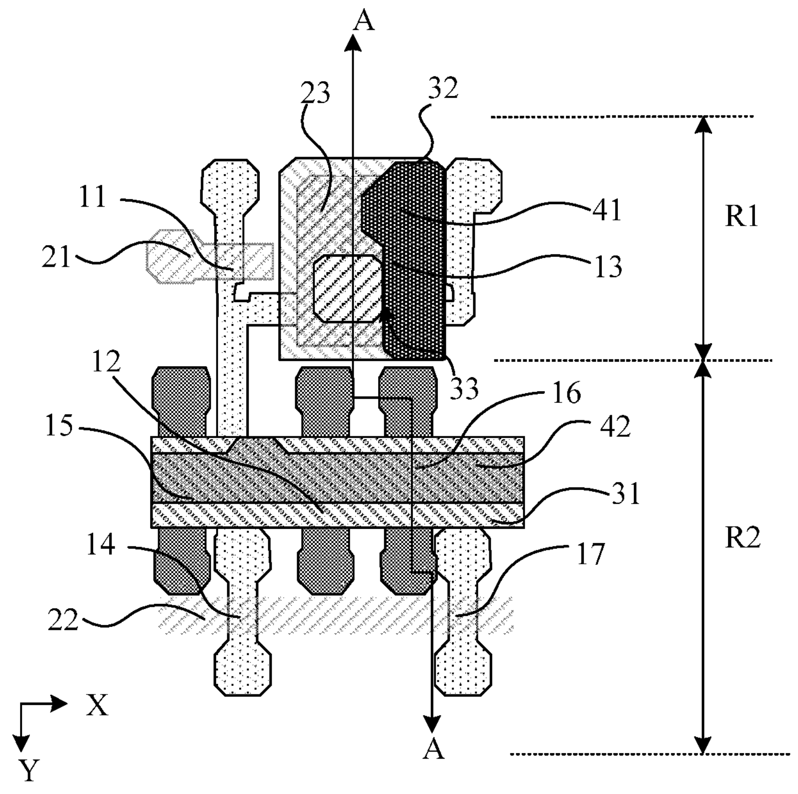
FIG. 16*a* is a schematic diagram of a pixel circuit after a pattern of a third conductive layer is formed according to the present disclosure.

As shown in FIG. 16*a*, in an exemplary embodiment, the first auxiliary signal line 41 extends along a second direction Y and is disposed in the first region R1, a shape of the first auxiliary signal line 41 may be in a shape of a "1", and the first auxiliary signal line 41 is connected with the first electrode plate 23 through a via formed subsequently.

As shown in FIG. 16*a*, in an exemplary embodiment, the second auxiliary signal line 42 extends along the first direction X and is disposed in the second region R2, and the second auxiliary signal line 42 is connected with the first scan signal line 31 through a via on the fifth insulation layer 95 (the via may be disposed in a bezel region, not shown in the figure).

As shown in FIG. 16*a*, there is an overlapping region between an orthographic projection of the second auxiliary signal line 42 on the base substrate 10 and an orthographic projection of the second active layer 12 of the second transistor T2 on the base substrate 10. A region where the first scan signal line 31 and the second auxiliary signal line 42 are overlapped with the second active layer 12 of the second transistor T2 serves as a double-gate structure of the second transistor T2. There is an overlapping region between the orthographic projection of the second auxiliary signal line 42 on the base substrate 10 and an orthographic projection of the fifth active layer 15 of the fifth transistor T5 on the base substrate 10. A region where the first scan signal line 31 and the second auxiliary signal line 42 are overlapped with the fifth active layer 15 of the fifth transistor T5 serves as a double-gate structure of the fifth transistor T5. There is an overlapping region between the orthographic projection of the second auxiliary signal line 42 on the base substrate 10 and an orthographic projection of the sixth active layer 16 of the sixth transistor T6 on the base substrate 10. A region where the first scan signal line 31 and the second auxiliary signal line 42 are overlapped with the sixth active layer 16 of the sixth transistor T6 serves as a double-gate structure of the sixth transistor T6.

Figure 16B:
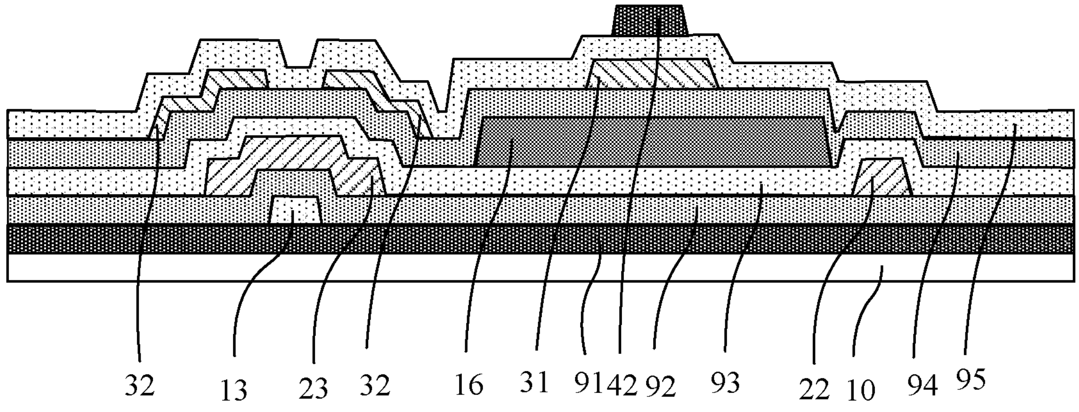
FIG. 16*b* is a sectional view taken along an A-A direction in FIG. 16*a*.

As shown in FIG. 16*b*, in a plane perpendicular to the base substrate, the first insulation layer 91 is disposed on the base substrate 10, the first semiconductor layer is disposed on the first insulation layer 91, the second insulation layer 92 covers the first semiconductor layer, the first conductive layer is disposed on the second insulation layer 92, the third insulation layer 93 covers the first conductive layer, the second semiconductor layer is disposed on the third insulation layer 93, the fourth insulation layer 94 covers the second semiconductor layer, the second conductive layer is disposed on the fourth insulation layer 94, the fifth insulation layer 95 is disposed on the second conductive layer, and the third conductive layer is disposed on the fifth insulation layer 95. The second conductive layer at least includes the first auxiliary signal line 41 and the second auxiliary signal line 42.

Figure 17A:
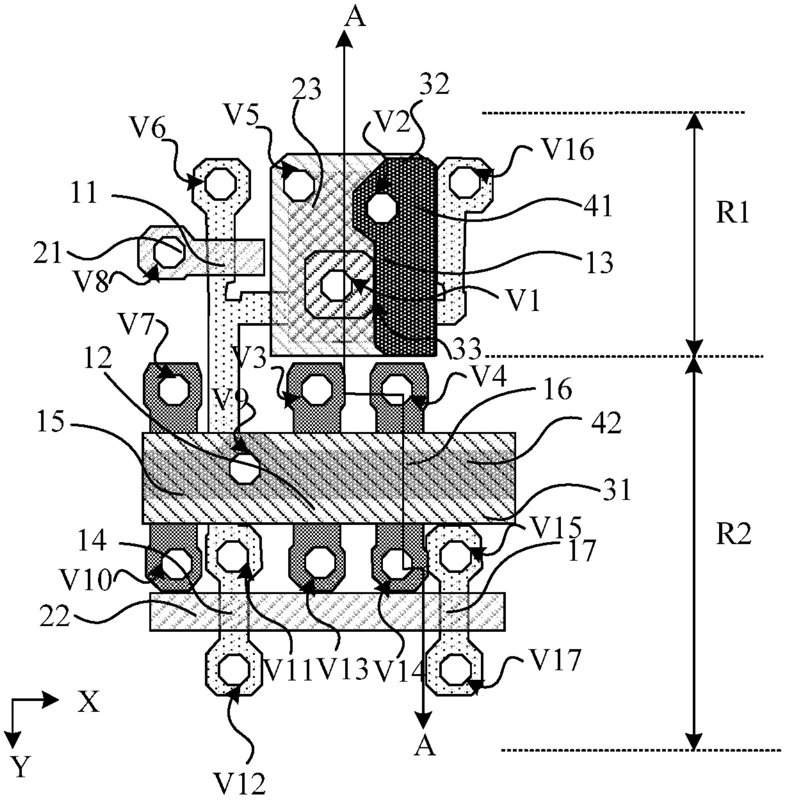
FIG. 17*a* is a schematic diagram of a pixel circuit after a pattern of a sixth insulation layer is formed according to the present disclosure.
Figure 17B:
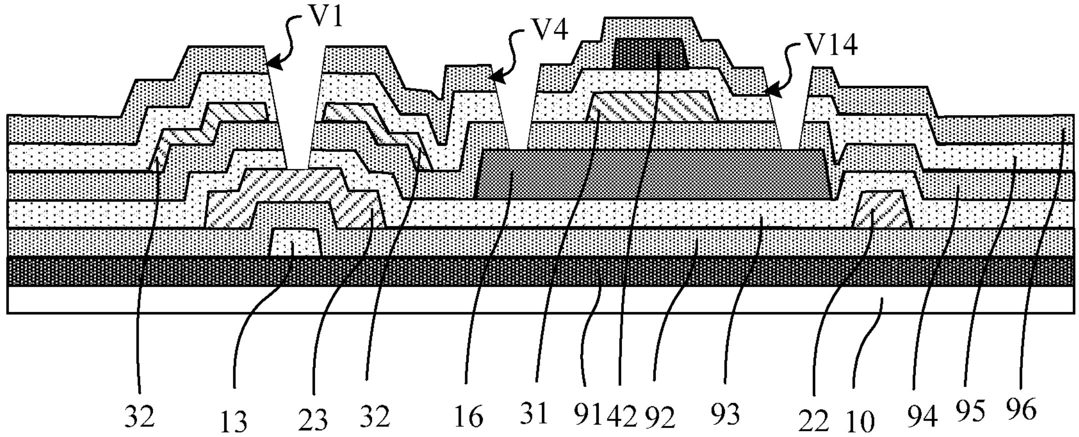
FIG. 17*b* is a sectional view along an A-A direction in FIG. 17*b*.

(16) A via pattern is formed. In an exemplary embodiment, forming a via pattern may include: depositing a sixth insulation thin film on the base substrate on which the aforementioned patterns are formed, and patterning the sixth insulation thin film through a patterning process to form a sixth insulation layer covering the third conductive layer. The sixth insulation layer is provided with multiple vias which at least include: a first via V1, a second via V2, a third via V3, a fourth via V4, a fifth via V5, a sixth via V6, a seventh via V7, an eighth via V8, a ninth via V9, a tenth via V10, an eleventh via V11, a twelfth via V12, a thirteenth via V13, a fourteenth via V14, a fifteenth via V15, a sixteenth via V16, and a seventeenth via V17. As shown in FIG. 17*a* and FIG. 17*b*, FIG. 17*b* is a sectional view taken along an A-A direction in FIG. 17*a*.

As shown in FIG. 17*a*, in an exemplary embodiment, the first via Vi is located in the opening 33 of the second electrode plate 32. An orthographic projection of the first via V1 on the base substrate is located within a range of the orthographic projection of the opening 33 on the base substrate. The sixth insulation layer, the fifth insulation layer, the fourth insulation layer, and the third insulation layer in the first via V1 are etched off to expose a surface of the first electrode plate 23. In an exemplary embodiment, the second via V2 is located in the first region R1, and the sixth insulation layer in the second via V2 is etched off to expose a surface of the first auxiliary signal line 41. In an exemplary embodiment, the third via V3 and the fourth via V4 are both located in the second region R2, the sixth insulation layer, the fifth insulation layer, and the fourth insulation layer in the third via V3 are etched off to expose a surface of a second region of the second active layer, and the sixth insulation layer, the fifth insulation layer, and the fourth insulation layer in the fourth via V4 are etched off to expose a surface of a first region of the sixth active layer. The first via V1, the second via V2, the third via V3, and the fourth via V4 are configured so that the second electrode of the second transistor T2, the first electrode of the sixth transistor T6, the first auxiliary signal line 41, and the gate electrode of the third transistor T3 which are subsequently formed are connected with the first electrode plate 23 through the vias.

In an exemplary embodiment, the fifth via V5 is located in a region where the second electrode plate 32 is located. An orthographic projection of the fifth via V5 on the base substrate is within a range of the orthographic projection of the second electrode plate 32 on the base substrate. The sixth insulation layer and the fifth insulation layer in the fifth via V5 are etched off to expose a surface of the second electrode plate 32. In an exemplary embodiment, the sixth via V6 is located in the first region R1, the sixth insulation layer, the fifth insulation layer, the fourth insulation layer, the third insulation layer, and the second insulation layer in the sixth via V6 are etched off so as to expose a surface of a first region of the first active layer. The fifth via V5 and the sixth via V6 are configured so that a subsequently formed power supply connection line is connected with the second electrode plate 32 and the first electrode of the first transistor T1 through the vias.

In an exemplary embodiment, the seventh via V7 is located in the second region R2, and the sixth insulation layer, the fifth insulation layer, and the fourth insulation layer in the seventh via V7 are etched off to expose a surface of a first region of the fifth active layer. The seventh via V7 is configured so that a data connection line formed subsequently is connected with the first electrode of the fifth transistor T5 through the via.

In an exemplary embodiment, the eighth via V8 is located in the first region R1, and the sixth insulation layer, the fifth insulation layer, the fourth insulation layer, and the third insulation layer in the eighth via V8 are etched away to expose a surface of the first gate block 21. In an exemplary embodiment, the ninth via V9 is located in the second region R2, and the sixth insulation layer in the ninth via V9 is etched off to expose a surface of the second auxiliary signal line 42. The eighth via V8 and the ninth via V9 are configured so that the first gate block 21 is connected with the second auxiliary signal line 42 through the vias.

In an exemplary embodiment, the tenth via V10 and the eleventh via V11 are both located in the second region R2, the sixth insulation layer, the fifth insulation layer, and the fourth insulation layer in the tenth via V10 are etched off to expose a surface of a second region of the fifth active layer, and the sixth insulation layer, the fifth insulation layer, the fourth insulation layer, the third insulation layer, and the second insulation layer in the eleventh via V11 are etched off to expose a surface of a first region of the fourth active layer. The tenth via V10 and the eleventh via V11 are configured so that the second electrode of the fifth transistor T5 formed subsequently is connected with the first electrode of the fourth transistor T4 through the vias.

In an exemplary embodiment, the twelfth via V12 and the thirteenth via V13 are both located in the second region R2, the sixth insulation layer, the fifth insulation layer, the fourth insulation layer, the third insulation layer, and the second insulation layer in the twelfth via V12 are etched off to expose a surface of a second region of the fourth active layer, and the sixth insulation layer, the fifth insulation layer, and the fourth insulation layer in the eleventh via V11 are etched off to expose a surface of a first region of the second active layer. The twelfth via V12 and the thirteenth via V13 are configured so that the second electrode of the fourth transistor T4 formed subsequently is connected with the first electrode of the second transistor T2 through the vias.

In an exemplary embodiment, the seventeenth via V17 is located in the second region R2, and the sixth insulation layer, the fifth insulation layer, the fourth insulation layer, the third insulation layer, and the second insulation layer in the seventeenth via V17 are etched off to expose a surface of a second region of the seventh active layer. The seventeenth via V17 is configured so that the second electrode of the seventh transistor T7 subsequently formed is connected with an anode connection line through the via.

As shown in FIG. 17*a* and FIG. 17*b*, in a plane perpendicular to the base substrate, the first insulation layer 91 is disposed on the base substrate 10. The first semiconductor layer is disposed on the first insulation layer 91. The second insulation layer 92 covers the first semiconductor layer. The first conductive layer is disposed on the second insulation layer 92. The third insulation layer 93 covers the first conductive layer. The second semiconductor layer is disposed on the third insulation layer 93. The fourth insulation layer 94 covers the second semiconductor layer. The second conductive layer is disposed on the fourth insulation layer 94. The fifth insulation layer 95 is disposed on the second conductive layer. The third conductive layer is disposed on the fifth insulation layer 95. The sixth insulation layer 96 covers the third conductive layer, and the sixth insulation layer 96 is provided with multiple vias.

Figure 18A:
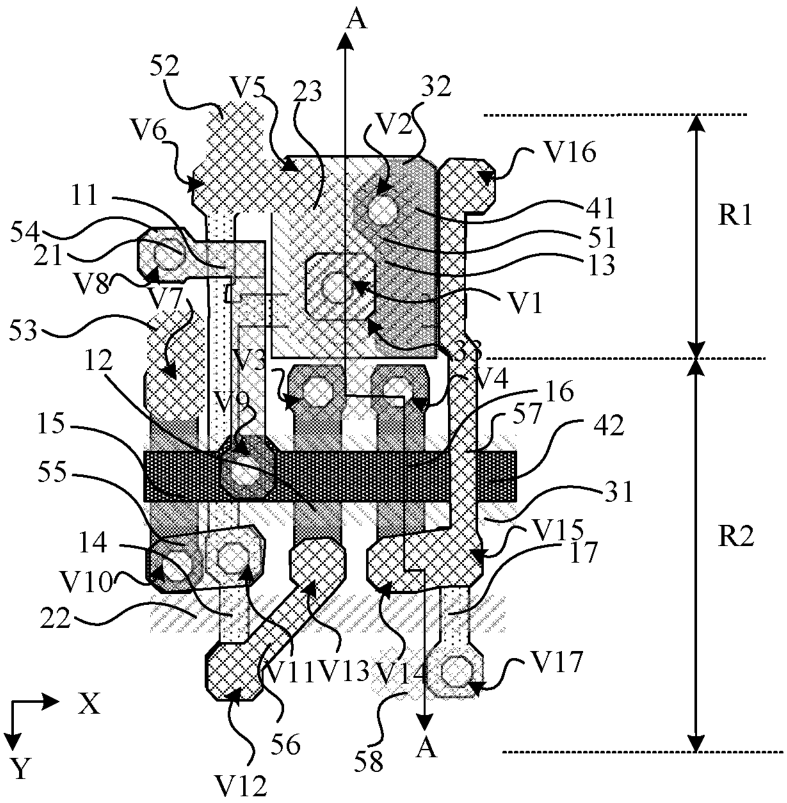
FIG. 18*a* is a schematic diagram of a pixel circuit after a pattern of a fourth conductive layer is formed according to the present disclosure.
Figure 18B:
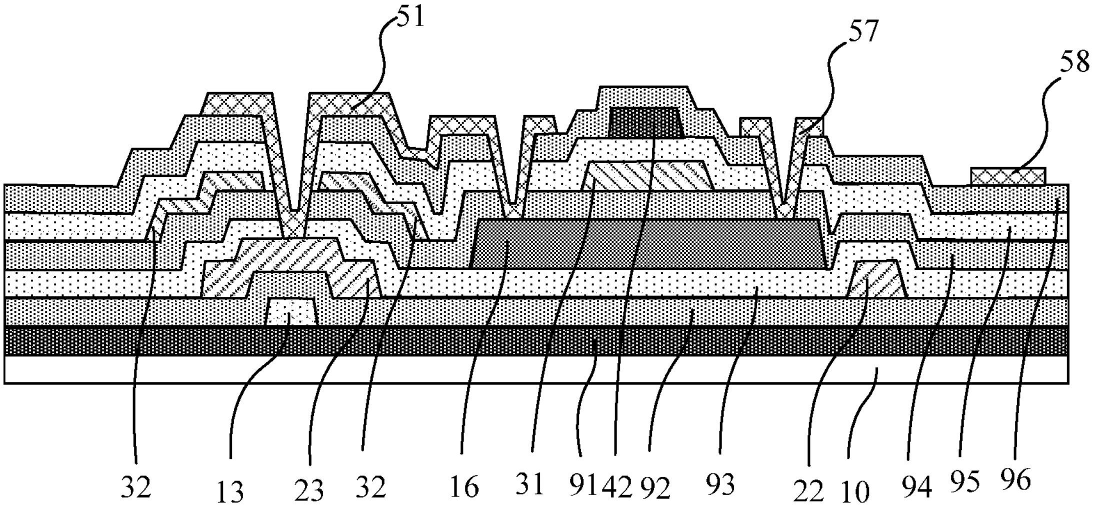
FIG. 18*b* is a sectional view taken along an A-A direction in FIG. 18A.

(17) A pattern of a fourth conductive layer is formed. In an exemplary embodiment, forming a fourth conductive layer may include: depositing a fourth metal thin film on the base substrate on which the aforementioned patterns are formed, and patterning the fourth metal thin film through a patterning process to form a fourth conductive layer disposed on the sixth insulation layer 96. The fourth conductive layer at least includes a first connection electrode 51 and a power supply connection line 52, a data connection line 53, a second connection electrode 54, a third connection electrode 55, a fourth connection electrode 56, a fifth connection electrode 57, and a sixth connection electrode 58, as shown in FIG. 18*a* and FIG. 18*b*, wherein FIG. 18*b* is a sectional view taken along an A-A direction in FIG. 18*a*. In an exemplary embodiment, the fourth conductive layer may be referred to as a first source drain metal (SD1) layer.

As shown in FIG. 18*a*, in an exemplary embodiment, the first connection electrode 51 is disposed in the first region R1 and the second region R2, is connected with the first electrode plate 23 through the first via V1 on one hand, is connected with the first auxiliary signal line 41 through the second via V2 on the other hand, and is connected with the second active layer through the third via V3, and is connected with the sixth active layer through the fourth via V4. The first connection electrode 51 is configured so that the first electrode plate 23, the first auxiliary signal line 41, the second active layer, and the sixth active layer are connect with each other.

In an exemplary embodiment, a zigzag-shaped power supply connection line 52 is disposed in the first region R1, is connected with the second electrode plate 32 through the fifth via V5 on one hand and is connected with the first electrode of the first transistor through the sixth via V6 on the other hand. The power supply connection line 51 is configured to be connected with the first power supply line formed subsequently.

In an exemplary embodiment, the data connection line 53 extends along a second direction Y, is connected with the first electrode of the fifth transistor through the seventh via V7, and the data connection line 53 is configured to be connected with the data signal line formed subsequently.

In an exemplary embodiment, the second connection electrode 54 is disposed in the first region R1 and the second region R2, is connected with the first gate block 21 through the eighth via V8 on one hand and is connected with the second auxiliary signal line 42 through the ninth via V9 on the other hand, and the second connection electrode 54 is configured so that the first gate block 21 is connected with the second auxiliary signal line 42. Since the second auxiliary signal line 42 is connected with the first scan signal line 31, the first gate block 21 is connected with the first scan signal line 31.

In an exemplary embodiment, the third connection electrode 55 is disposed in the second region R2, is connected with the fifth active layer through the tenth via V10 on one hand and is connected with the fourth active layer through the eleventh via V11 on the other hand, and the third connection electrode 55 is configured so that the fifth active layer is connected with the fourth active layer.

In an exemplary embodiment, the fourth connection electrode 56 is disposed in the second region R2, is connected with the fourth active layer through the twelfth via V12 on one hand and is connected with the second active layer through the thirteenth via V13 on the other hand, and the fourth connection electrode 56 is configured so that the fourth active layer is connected with the second active layer.

In an exemplary embodiment, the fifth connection electrode 57 is disposed in the first region R1 and the second region R2, is connected with the sixth active layer through the fourteenth via V14 on one hand and is connected with the seventh active layer through the fifteenth via V15 on the other hand, and is connected with the third active layer through the sixteenth via V16. The fifth connection electrode 57 is configured so that the sixth active layer and the seventh active layer are connected with the third active layer.

In an exemplary embodiment, the sixth connection electrode 58 is disposed in the second region R2, is connected with the seventh active layer through the seventeenth via V17, and the sixth connection electrode 58 is configured so that the seventh active layer is connected with an anode connection electrode formed subsequently.

As shown in FIG. 18*b*, in a plane perpendicular to the base substrate, the first insulation layer 91 is disposed on the base substrate 10. The first semiconductor layer is disposed on the first insulation layer 91. The second insulation layer 92 covers the first semiconductor layer. The first conductive layer is disposed on the second insulation layer 92. The third insulation layer 93 covers the first conductive layer. The second semiconductor layer is disposed on the third insulation layer 93. The fourth insulation layer 94 covers the second semiconductor layer. The second conductive layer is disposed on the fourth insulation layer 94. The fifth insulation layer 95 is disposed on the second conductive layer. The third conductive layer is disposed on the fifth insulation layer 95. The sixth insulation layer 96 covers the third conductive layer, and the sixth insulation layer 96 is provided with multiple vias. The fourth conductive layer covers multiple vias, and The fourth conductive layer at least includes the first connection electrode 51, the power supply connection line 52, the data connection line 53, the second connection electrode 54, the third connection electrode 55, the fourth connection electrode 56, the fifth connection electrode 57, and the sixth connection electrode 58.

Figure 19A:
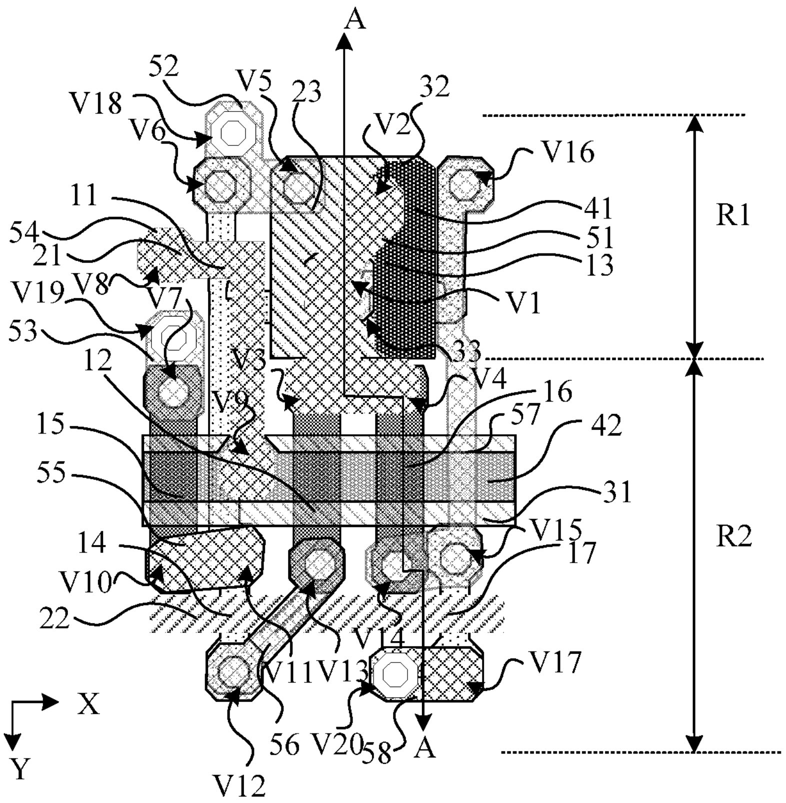
FIG. 19*a* is a schematic diagram of a pixel circuit after a pattern of a first planarization layer is formed according to the present disclosure.
Figure 19B:
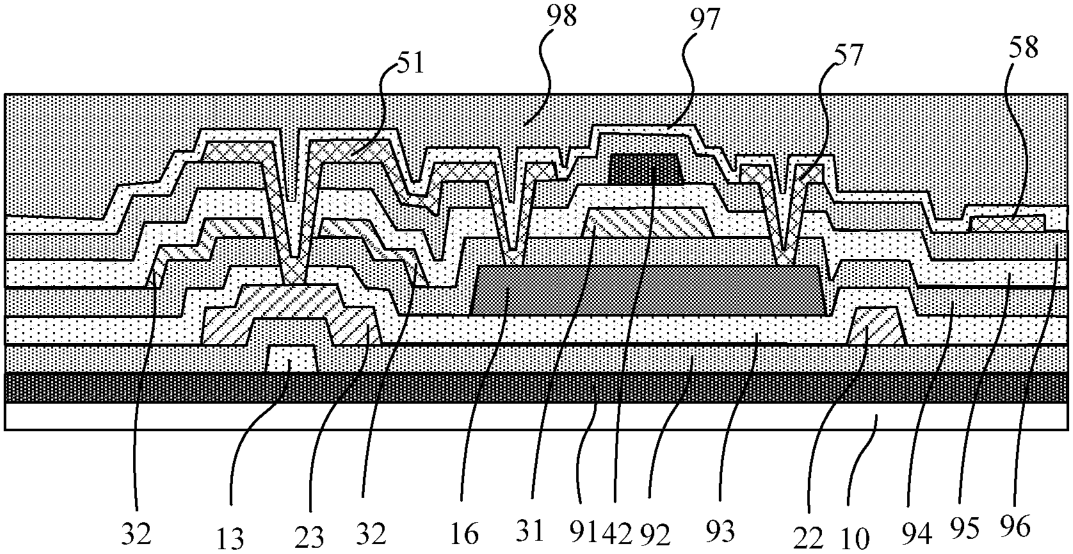
FIG. 19*b* is a sectional view taken along an A-A direction in FIG. 19A.

(18) Patterns of a seventh insulation layer 97 and a first planarization layer 98 are formed. In an exemplary embodiment, an operation that the patterns of the seventh insulation layer 97 and the first planarization layer 98 are formed may include: a seventh insulation thin film is deposited first on the base substrate on which the above-mentioned patterns are formed, and then a first planarization thin film is coated, the seventh insulation thin film and the first planarization thin film are patterned respectively through a patterning process to form the seventh insulation layer 97 covering the fourth conductive layer and the first planarization layer 98 covering the seventh insulation layer 97. The seventh insulation layer 97 and the first planarization layer 98 are provided with multiple vias, wherein the multiple vias at least include an eighteenth via V18, a nineteenth via V19, and a twentieth via V20, as shown in FIG. 19*a* and FIG. 19*b*, and FIG. 19*b* is a sectional view along an A-A direction in FIG. 18*a*. In an exemplary embodiment, the fourth insulation layer 97 may be referred to as a Passivation (PVX) layer.

As shown in FIG. 19*a* and FIG. 19*b*, the eighteenth via V18 is located in a region where the power supply connection line 52 is located, the first planarization layer and the seventh insulation layer in the eighteenth via V18 are removed to expose a surface of the power supply connection line 52, and the eighteenth via V18 is configured so that the first power supply line formed subsequently is connected with the power supply connection line 52 through the via. The nineteenth via V19 is located in the first region R1, the first planarization layer and the seventh insulation layer in the nineteenth via V19 are removed to expose a surface of the data connection line 53. The nineteenth via V19 is configured so that a data signal line formed subsequently is connected with the data connection line 53 through the via. The twentieth via V20 is located in the second region R2, the first planarization layer and the seventh insulation layer in the twentieth via V20 are removed to expose a surface of the sixth connection electrode 58, and the twentieth via V20 is configured so that an anode connection line formed subsequently is connected with the sixth connection electrode 58 through the via.

Figure 20A:
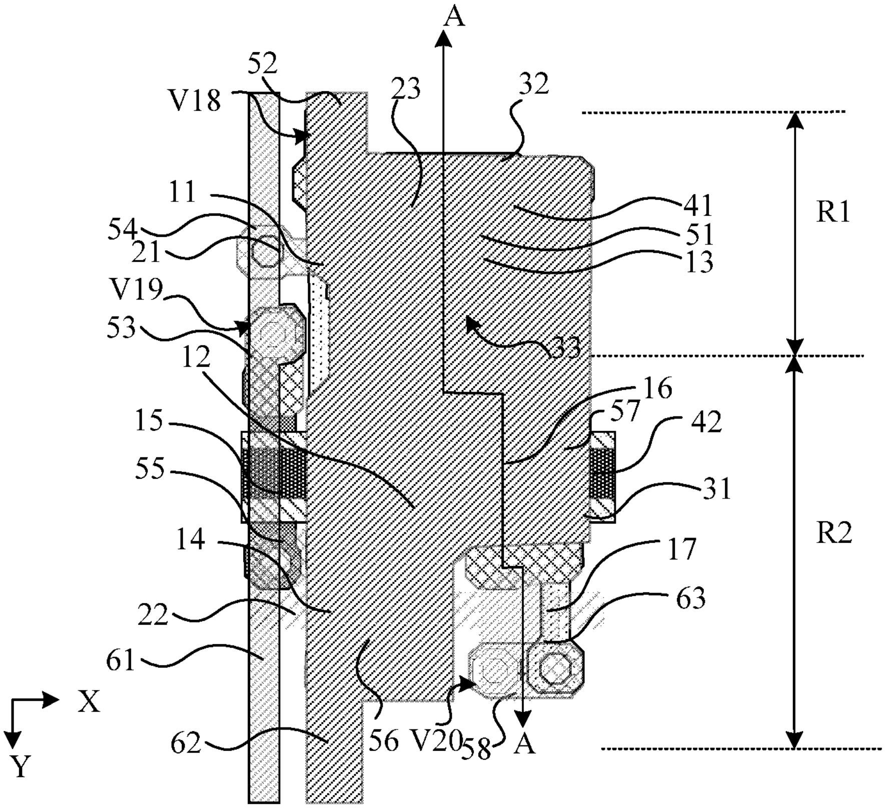
FIG. 20*a* is a schematic diagram of a pixel circuit after a pattern of a fifth conductive layer is formed according to the present disclosure.
Figure 20B:
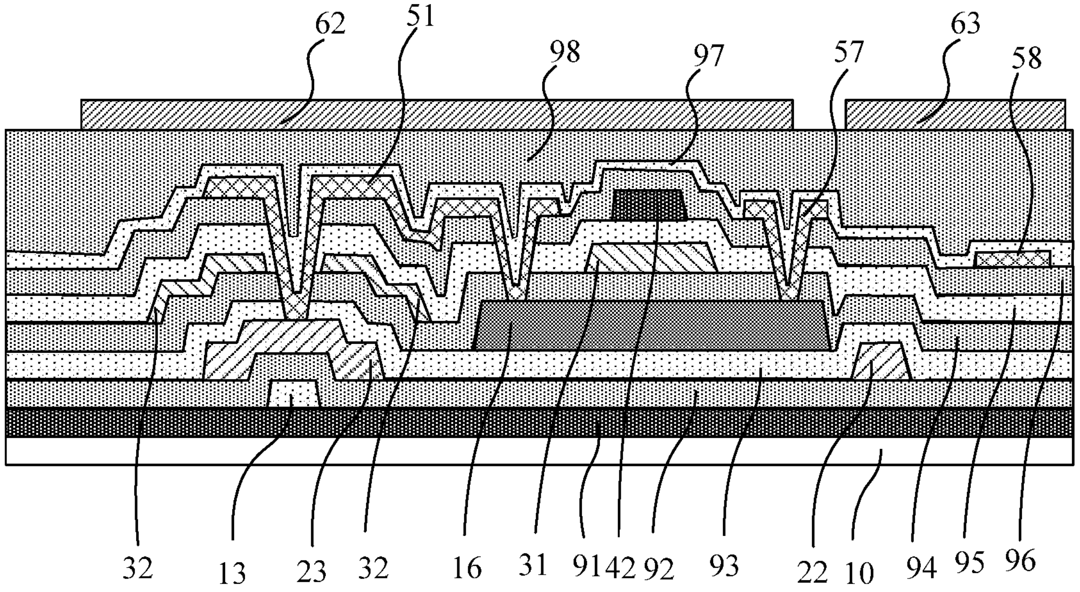
FIG. 20*b* is a sectional view taken along an A-A direction in FIG. 20*a*.

(23) A pattern of a fifth conductive layer is formed. In an exemplary embodiment, an operation that a fifth conductive layer is formed may include: a fifth metal thin film is deposited on the base substrate on which the above-mentioned patterns are formed, and the fifth metal thin film is patterned through a patterning process to form the fifth conductive layer disposed on the first planarization layer 98. The fifth conductive layer at least includes: a data signal line 61, a first power supply line 62, and an anode connection electrode 63, as shown in FIG. 20*a* and FIG. 20*b*, and FIG. 20*b* is a sectional view along an A-A direction in FIG. 20*a*. In an exemplary embodiment, the fifth conductive layer may be referred to as a second source drain metal (SD2) layer.

As shown in FIG. 20*a* and FIG. 20*b*, the data signal line 61 extends along a second direction Y, and the data signal line 61 is connected with the data connection line 53 through the nineteenth via V19. Since the data connection line 53 is connected with the first electrode of the fifth transistor through the seventh via V7, a connection between the data signal line and the first electrode of the fifth transistor is achieved, so that a data signal transmitted by the data signal line is written to the fifth transistor. The first power supply line 62 extends along the second direction Y, and the first power supply line 62 is connected with the power supply connection line 52 through the eighteenth via V18, so that the power supply connection line 52 has a same potential as the first power supply line 62. The anode connection electrode 63 may be in a shape of a rectangle, the anode connection electrode 63 is connected with the sixth connection electrode 58 through the twentieth via V20, and the anode connection electrode 63 is configured to be connected with an anode formed subsequently.

(24) A pattern of a second planarization layer 99 is formed. In an exemplary embodiment, an operation that the pattern of the second planarization layer 99 is formed may include: a second planarization thin film is coated on the base substrate on which the above-mentioned patterns are formed, and the second planarization thin film is patterned through a patterning process to form the second planarization layer 99 that covers the fifth conductive layer. The second planarization layer 99 is at least provided with a twenty-first via V21, as shown in FIG. 10 and FIG. 11, and FIG. 11 is sectional view along an A-A direction in FIG. 10.

As shown in FIG. 10 and FIG. 11, in an exemplary embodiment, the twenty-first via V21 is located in a region where the anode connection electrode 63 is located. The second planarization layer in the twenty-first via V21 is removed to expose a surface of the anode connection electrode 63. The twenty-first via V21 is configured so that the anode formed subsequently is connected with the anode connection electrode 63 through the via.

(25) An anode pattern is formed. In an exemplary embodiment, forming an anode pattern may include: depositing a transparent conductive thin film on the base substrate on which the above-mentioned patterns are formed, and patterning the transparent conductive thin film through a patterning process to form an anode disposed on the second planarization layer.

In an exemplary embodiment, the anode has a hexagonal shape, and the anode is connected with the anode connection electrode through the twenty-first via. Since the anode connection electrode is connected with the sixth connection electrode through the twentieth via and the sixth connection electrode is connected with the seventh active layer through the seventeenth via, so that the pixel drive circuit may drive the light-emitting element to emit light.

In an exemplary embodiment, a subsequent preparation process may include: a pixel definition thin film is coated, and the pixel definition thin film is patterned through a patterning process to form a pixel definition layer. A pixel definition layer of each sub-pixel is provided with a pixel opening, and the pixel opening exposes the anode. An organic light-emitting layer is formed using an evaporation or ink-jet printing process, and a cathode is formed on the organic light-emitting layer. An encapsulation layer is formed. The encapsulation layer may include a first encapsulation layer, a second encapsulation layer, and a third encapsulation layer that are stacked. The first encapsulation layer and the third encapsulation layer may be made of an inorganic material. The second encapsulation layer may be made of an organic material. The second encapsulation layer is disposed between the first encapsulation layer and the third encapsulation layer, so that it may be ensured that external water vapor cannot enter a light-emitting structure layer.

In an exemplary embodiment, the base substrate may be a flexible substrate or may be a rigid substrate. The rigid substrate may be, but is not limited to, one or more of glass and quartz. The flexible substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary embodiment, the flexible substrate may include a first flexible material layer, a first inorganic material layer, a semiconductor layer, a second flexible material layer, and a second inorganic material layer which are stacked, wherein materials of the first flexible material layer and the second flexible material layer may be polyimide (PI), polyethylene terephthalate (PET), or a polymer soft film with a surface treatment; materials of the first inorganic material layer and the second inorganic material layer may be silicon nitride (SiNx), or silicon oxide (SiOx), etc., for improving water-resistance and oxygen-resistance of the base substrate; and a material of the semiconductor layer may be amorphous Silicon (a-Si).

In an exemplary embodiment, the first conductive layer, the second conductive layer, the third conductive layer, the fourth conductive layer, and the fifth conductive layer may be made of a metal material, such as any one or more of Argentum (Ag), Copper (Cu), Aluminum (Al), and Molybdenum (Mo), or an alloy material of the above-mentioned metals, such as an Aluminum-Neodymium alloy (AlNd) or a Molybdenum-Niobium alloy (MoNb), and may be in a single-layer structure, or a multilayer composite structure such as Mo/Cu/Mo. The first insulation layer, the second insulation layer, the third insulation layer, the fourth insulation layer, the fifth insulation layer, the sixth insulation layer, and the seventh insulation layer may be made of any one or more of silicon oxide (SiOx), silicon nitride (SiNx), and silicon oxynitride (SiON), and may be single layers, multiple layers, or composite layers. The first insulation layer is referred to as a first buffer layer, which is used for improving the water and oxygen resistance of the base substrate. The second insulation layer is referred to as a first Gate Insulation (GI1) layer, and the third insulation layer is referred to as a second buffer layer, the fourth insulation layer is referred to as a Gate Insulation layer (GI2), the fifth insulation layer is referred to as a third Gate Insulation (GI3) layer, the sixth insulation layer is referred to as an Interlayer Dielectric (ILD) layer, and the seventh insulation layer is referred to as a Passivation (PVX) layer. The first planarization layer and the second planarization layer may be made of an organic material, and the transparent conductive thin film may be made of Indium Tin Oxide (ITO) or Indium Zinc Oxide (IZO). The first semiconductor layer may be made of polysilicon (p-Si) and the second semiconductor layer may be made of an oxide.

The structure of the display substrate and the preparation process thereof shown in the present disclosure are only an exemplary illustration. In an exemplary embodiment, variation of a corresponding structure and addition or reduction of the patterning process may be performed as practically required, which is not limited in the present disclosure.

Due to influences of process instability, foreign matters, temperature, and other factors in the preparation process of an OLED display screen, a threshold voltage of a Driving Thin Film Transistor (DTFT) is easily shifted. Under a condition of a normal lighting voltage, a turn-on degree of a driving thin film transistor is uneven, which easily leads to different magnitudes of currents flowing through a light-emitting diode and a problem of uneven brightness of the OLED display screen. In addition, at present, a screen of a mobile phone is developing towards a narrow bezel. In order to enhance competitiveness of a product, a screen bezel needs to be reduced. Meanwhile, since a leakage current of a commonly used LTPS 7T1C pixel driving circuit switch TFT is about $10^{-13}$ A, which will make brightness of an OLED device change visible to human eyes within one frame due to a leakage current of a gate of a Driving Thin Film Transistor (DTFT) in a light-emitting stage, and flicker will appear. Especially when an OLED screen works at a low frequency and low brightness, the flicker will be more obvious, which is an urgent problem to be solved.

It may be seen from the structure and preparation process of the display substrate described above that according to the pixel circuit provided in the embodiment of the present disclosure, by setting a reasonable layout structure, not only space may be saved and it is beneficial to high-resolution display, but also there are fewer leakage channels, and a problem of screen flickering at a low frequency and low brightness may be improved; and meanwhile, by setting reasonable driving timing, internal compensation may be achieved, which avoids an influence of drift of a threshold voltage of a driving sub-circuit on a driving current of a light-emitting element, and improves uniformity of a displayed image and display quality of a display panel. The preparation process in the present disclosure may be well compatible with an existing preparation process, and the process is simple to achieve, easy to implement, high in production efficiency, low in production cost, and high in yield.

Figure 21A:
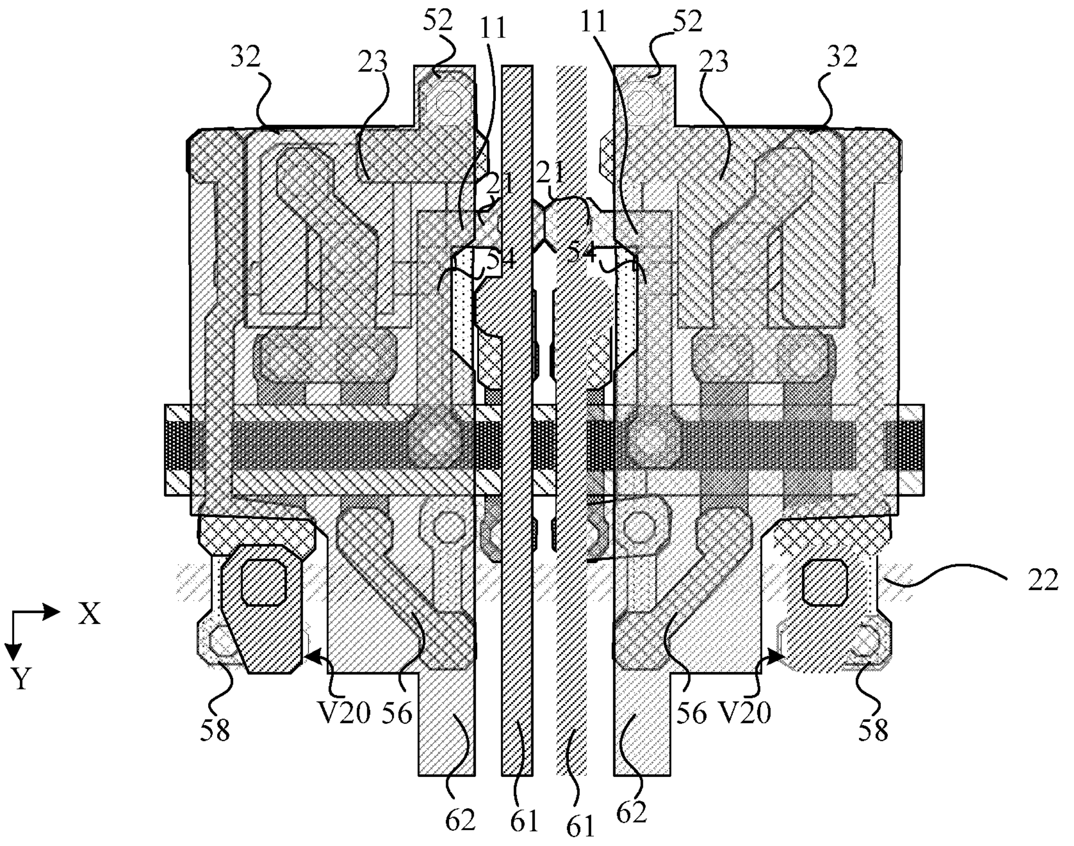
FIG. 21*a* and FIG. 21*b* are schematic diagrams of structures of two types of pixel circuits in two adjacent sub-pixels in a first direction according to an embodiment of the present disclosure.
Figure 21B:
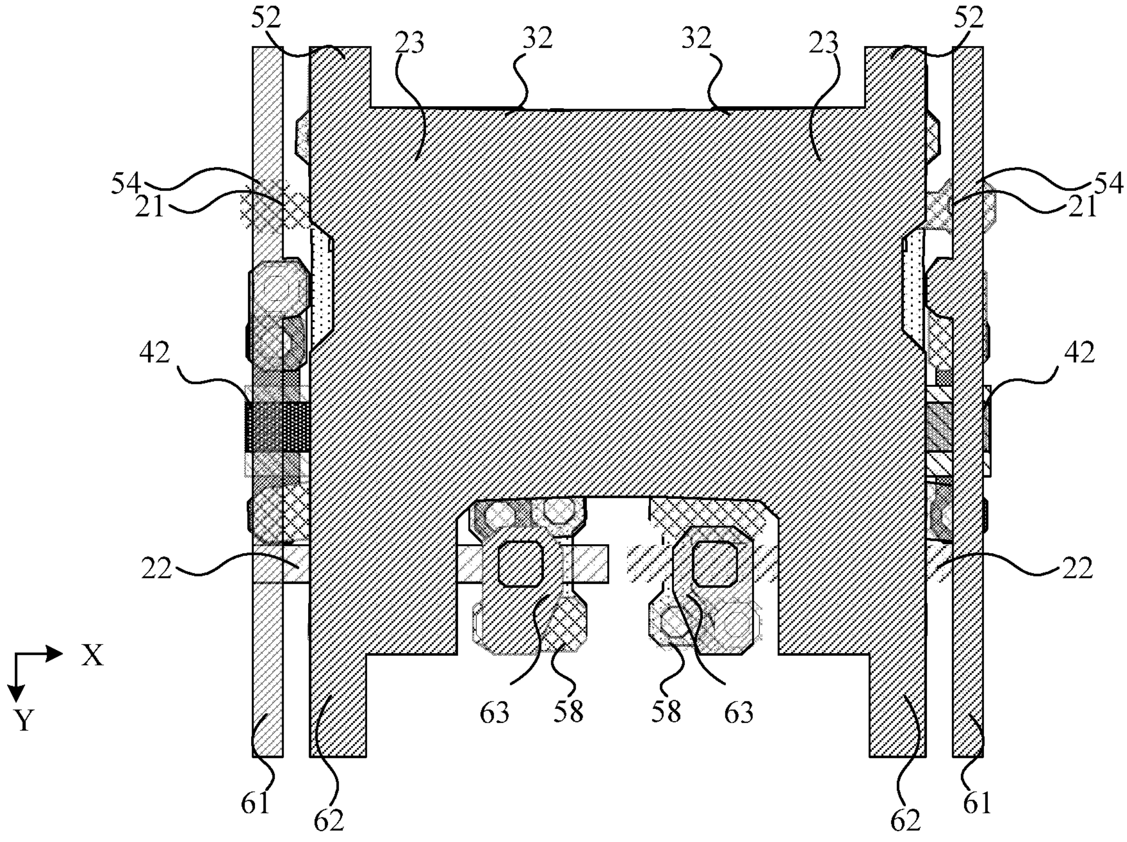

In an exemplary embodiment, as shown in FIG. 21*a* or FIG. 21*b*, two adjacent sub-pixels in a first direction X may be disposed in a mirror manner.

In an exemplary embodiment, power supply connection lines 52 in two adjacent sub-pixels in a first direction X may be of a mutual-connected integral structure.

In an exemplary embodiment, two adjacent sub-pixels in a first direction X may be provided with only one eighteenth via V18 for connecting a first power supply line 62 with a power supply connection line 52, and the one eighteenth via V18 may be located in any one of the two adjacent sub-pixels in the first direction X, or may be located between the two adjacent sub-pixels in the first direction X.

In an exemplary embodiment, since a first active layer 11 is connected with a first power supply line 62 through a power supply connection line 52, first active layers 11 in two adjacent sub-pixels in a first direction X may be of a mutual-connected integral structure.

In an exemplary embodiment, first gate blocks 21 in two adjacent sub-pixels in a first direction X may be of a mutual-connected integral structure.

In an exemplary embodiment, second connection electrodes 54 in two adjacent sub-pixels in a first direction X may be of a mutual-connected integral structure.

In an exemplary embodiment, two adjacent sub-pixels in a first direction X may be provided with only one second connection electrode 54 for connecting a first gate block 21 with a second auxiliary signal line 42 and a set of corresponding vias (i.e., the eighth via V8 and the ninth via V9, as shown in FIG. 17*a*). For example, at least one of the set of corresponding vias (i.e. the eighth via V8 and the ninth via V9, as shown in FIG. 17*a*) may also be located between the two adjacent pixels. For example, the second connection electrode 54 and a corresponding via may be located in any one of the two sub-pixels adjacent in the first direction X.

In an exemplary embodiment, two adjacent sub-pixels in a first direction X may be respectively provided with a second connection electrode 54 for connecting a first gate block 21 with a second auxiliary signal line 42 and a set of corresponding vias (i.e., the eighth via V8 and the ninth via V9, as shown in FIG. 17*a*), such that second connection electrodes 54 in the two adjacent sub-pixels form a parallel structure, thereby reducing a connection resistance.

As shown in FIG. 21*b*, first power supply lines 62 in two adjacent sub-pixels in a first direction X may be of a mutual-connected integral structure, which may ensure that an anode is more flat after being disposed above.

Some embodiments of the present disclosure also provide a driving method of a pixel circuit, applied to the pixel circuit provided in the above-mentioned embodiment. The pixel circuit includes a driving sub-circuit, a writing sub-circuit, a compensation sub-circuit, a reset sub-circuit, a light-emitting element, a first scan signal line, a second scan signal line, a data signal line, a first power supply line, and a second power supply line. The pixel circuit has multiple scan cycles. In one scan cycle, the driving method includes following steps.

In step S1, in a reset stage, the writing sub-circuit writes a reset voltage signal of the data signal line to a second node in response to a control signal of the first scan signal line; and the reset sub-circuit writes a reset voltage signal of the second node to a first node in response to control signals of the first scan signal line and the second scan signal line; and the compensation sub-circuit writes a reset voltage signal of the first node to a third node in response to a control signal of the first scan signal line.

In this step, the first node and the third node are initialized through the writing sub-circuit, the reset sub-circuit, and the compensation sub-circuit, and a storage capacitor, an anode terminal voltage of the light-emitting element, and a control electrode voltage of the driving sub-circuit are reset so that remaining positive charges of the light-emitting element after the light-emitting element emitted light last time and charges remaining in the storage capacitor are eliminated.

In an exemplary embodiment, the pixel circuit further includes a second light-emitting control sub-circuit, and the step S1 further includes that the second light-emitting control sub-circuit writes a reset voltage signal of the third node to a fourth node in response to a control signal of the second scan signal line.

In step S2, in a data writing stage, the writing sub-circuit writes a data voltage signal of the data signal line to the second node in response to a control signal of the first scan signal line, and the compensation sub-circuit compensates the first node in response to a control signal of the first scan signal line.

In this step, a data voltage signal is provided to the data signal line. When the first node is charged to Vdata+Vth, a driving transistor is turned off Therefore, compensation for a threshold voltage of the driving transistor is achieved, and uniformity of a displayed image is improved.

In step S3, in a light-emitting stage, the driving sub-circuit provides a driving current to the third node in response to a control signal of the first node.

In this step, the generated driving current is as follows.

$$I=K^*(Vgs-Vth)^2=K^*[(V\text{data}\_H+Vth-Vdd)-Vth]^2=K^*[(V\text{data}\_H-Vdd]^2$$

Herein, I is the driving current flowing through the driving transistor, i.e., a driving current for driving the light-emitting element. K is a constant. Vgs is a voltage difference between a gate electrode and first electrode of the driving transistor. Vth is a threshold voltage of the driving transistor. Vdata is a data voltage output by the data signal line. Vdd is a power supply voltage output by the first power supply line.

In an exemplary embodiment, the pixel circuit further includes a first light-emitting control sub-circuit and a second light-emitting control sub-circuit. The step S3 further includes that the first light-emitting control sub-circuit provides a signal of the first power supply line to the second node in response to a control signal of the first scan signal line, and the second light-emitting control sub-circuit allows a driving current to pass between the third node and the fourth node in response to a control signal of the second scan signal line.

According to the driving method of the pixel circuit in the embodiment of the present disclosure, remaining positive charges of the light-emitting element after the light-emitting element emitted light last time are eliminated, compensation for a gate voltage of a thin film transistor is achieved, and uniformity of a displayed image and display quality of the display panel are improved. In addition, according to the driving method of the pixel circuit in the embodiment of the present disclosure, there are fewer leakage channels, so that a flicker effect at a low-frequency is improved. In addition, the pixel circuit of the embodiment of the present disclosure does not need a double-gate design, so that space occupied by the pixel circuit is reduced, and a screen resolution is improved.

Based on a same inventive concept, an embodiment of the present disclosure also provides a display apparatus, which includes the pixel circuit provided in the above-mentioned embodiments. The display apparatus of the present disclosure may be any product or component with a display function, such as a mobile phone, a tablet computer, a television, a display, a laptop computer, a digital photo frame, or a navigator. In an exemplary embodiment, the display apparatus may be a wearable display apparatus, which can be worn on a human body in some manners, such as a smart watch, and a smart bracelet.

Following points need to be noted.

The drawings of the embodiments of the present disclosure only involve structures involved in the embodiments of the present disclosure, and other structures may refer to conventional designs.

The embodiments of the present disclosure, i.e., features in the embodiments, may be combined with each other to obtain new embodiments if there is no conflict.

Although the embodiments disclosed in the present disclosure are as above, the described contents are only embodiments used for convenience of understanding the present disclosure and are not intended to limit the present disclosure. Any skilled person in the art to which the present disclosure pertains may make any modification and variation in forms and details of implementation without departing from the spirit and scope of the present disclosure. However, the scope of patent protection of the present disclosure should still be subject to the scope defined by the appended claims.

The invention claimed is:

1. A pixel circuit, comprising a driving sub-circuit, a writing sub-circuit, a compensation sub-circuit, and a reset sub-circuit, wherein the driving sub-circuit is connected with a first node, a second node, and a third node respectively, and is configured to provide a driving current to the third node in response to a control signal of the first node;

the writing sub-circuit is connected with a first scan signal line, a data signal line, and the second node respectively, and is configured to write a signal of the data signal line to the second node in response to a control signal of the first scan signal line, wherein the signal of the data signal line is a data voltage signal or a reset voltage signal;

the compensation sub-circuit is connected with a first power supply line, the first scan signal line, the first node, and the third node respectively, and is configured to write the reset voltage signal to the third node in response to the control signal of the first scan signal line; the compensation sub-circuit is further configured to compensate the first node in response to the control signal of the first scan signal line;

the reset sub-circuit is connected with the first scan signal line, a second scan signal line, the first node, and the second node respectively, and is configured to write the reset voltage signal to the first node in response to control signals of the first scan signal line and the second scan signal line;

the pixel circuit further comprises a first light-emitting control sub-circuit and a second light-emitting control sub-circuit;

the first light-emitting control sub-circuit is connected with the first power supply line, the first scan signal line, and the second node respectively, and is configured to provide a signal of the first power supply line to the second node in response to the control signal of the first scan signal line; and the second light-emitting control sub-circuit is connected with the second scan signal line, the third node, and a fourth node respectively, and is configured to write the reset voltage signal to the fourth node in response to the control signal of the second scan signal line; and the second light-emitting control sub-circuit is further configured to allow a driving current to pass between the third node and the fourth node.

2. The pixel circuit according to claim 1, wherein the reset sub-circuit comprises a second transistor and a fourth transistor;

a control electrode of the second transistor is connected with the first scan signal line, a first electrode of the second transistor is connected with a second electrode of the fourth transistor, and a second electrode of the second transistor is connected with the first node; a control electrode of the fourth transistor is connected with the second scan signal line, and a first electrode of the fourth transistor is connected with the second node;

or, the control electrode of the second transistor is connected with the first scan signal line, the first electrode of the second transistor is connected with the second node, and the second electrode of the second transistor is connected with the first electrode of the fourth transistor; and the control electrode of the fourth transistor is connected with the second scan signal line, and the second electrode of the fourth transistor is connected with the first node.

3. The pixel circuit according to claim 1, wherein the compensation sub-circuit comprises a sixth transistor and a storage capacitor, the driving sub-circuit comprises a third transistor, and the writing sub-circuit comprises a fifth transistor;

a control electrode of the sixth transistor is connected with the first scan signal line, a first electrode of the sixth transistor is connected with the third node, and a second electrode of the sixth transistor is connected with the first node;

one end of the storage capacitor is connected with the first node, and the other end of the storage capacitor is connected with the first power supply line;

a control electrode of the third transistor is connected with the first node, a first electrode of the third transistor is connected with the second node, and a second electrode of the third transistor is connected with the third node; and a control electrode of the fifth transistor is connected with the first scan signal line, a first electrode of the fifth transistor is connected with the data signal line, and a second electrode of the fifth transistor is connected with the second node.

4. The pixel circuit according to claim 1, wherein the first light-emitting control sub-circuit comprises a first transistor, and the second light-emitting control sub-circuit comprises a seventh transistor;

a control electrode of the first transistor is connected with the first scan signal line, a first electrode of the first transistor is connected with the first power supply line, and a second electrode of the first transistor is connected with the second node; and a control electrode of the seventh transistor is connected with the second scan signal line, a first electrode of the seventh transistor is connected with the third node, and a second electrode of the seventh transistor is connected with the fourth node.

5. The pixel circuit according to claim 1, wherein the control signal of the first scan signal line and the control signal of the second scan signal line are provided by two adjacent stages of a same group of shift registers.

6. The pixel circuit according to claim 1, further comprising a first light-emitting control sub-circuit and a second light-emitting control sub-circuit, and the reset sub-circuit comprises a second transistor and a fourth transistor; the compensation sub-circuit comprises a sixth transistor and a storage capacitor, the driving sub-circuit comprises a third transistor, and the writing sub-circuit comprises a fifth transistor; the first light-emitting control sub-circuit comprises a first transistor, and the second light-emitting control sub-circuit comprises a seventh transistor;

a control electrode of the second transistor is connected with the first scan signal line, a first electrode of the second transistor is connected with a second electrode of the fourth transistor, a second electrode of the second transistor is connected with the first node, a control electrode of the fourth transistor is connected with the second scan signal line, and a first electrode of the fourth transistor is connected with the second node; or, a control electrode of the second transistor is connected with the first scan signal line, a first electrode of the second transistor is connected with the second node, a second electrode of the second transistor is connected with a first electrode of the fourth transistor, a control electrode of the fourth transistor is connected with the second scan signal line, and a second electrode of the fourth transistor is connected with the first node;

a control electrode of the sixth transistor is connected with the first scan signal line, a first electrode of the sixth transistor is connected with the third node, and a second electrode of the sixth transistor is connected with the first node;

one end of the storage capacitor is connected with the first node, and the other end of the storage capacitor is connected with the first power supply line;

a control electrode of the third transistor is connected with the first node, a first electrode of the third transistor is connected with the second node, and a second electrode of the third transistor is connected with the third node;

a control electrode of the fifth transistor is connected with the first scan signal line, a first electrode of the fifth transistor is connected with the data signal line, and a second electrode of the fifth transistor is connected with the second node;

a control electrode of the first transistor is connected with the first scan signal line, a first electrode of the first transistor is connected with the first power supply line, and a second electrode of the first transistor is connected with the second node; and a control electrode of the seventh transistor is connected with the second scan signal line, a first electrode of the seventh transistor is connected with the third node, and a second electrode of the seventh transistor is connected with a fourth node.

7. The pixel circuit according to claim 6, wherein all of the first transistor, the third transistor, the fourth transistor, and the seventh transistor are first-type transistors, all of the second transistor, the fifth transistor, and the sixth transistor are second-type transistors, and the first-type transistors and the second-type transistors are of different transistor types.

8. The pixel circuit according to claim 7, wherein the first-type transistors are P-type thin film transistors; and the second-type transistors are N-type thin film transistors.

9. The pixel circuit according to claim 1, wherein the pixel circuit comprises a base substrate, and a first semiconductor layer, a first conductive layer, a second semiconductor layer, a second conductive layer, a third conductive layer, a fourth conductive layer, and a fifth conductive layer which are stacked on the base substrate;

the first semiconductor layer comprises an active layer of at least one polysilicon transistor, the first conductive layer comprises the second scan signal line and a first electrode plate of a storage capacitor, and there is an overlapping region between an orthographic projection of the second scan signal line on the base substrate and an orthographic projection of the active layer of the at least one polysilicon transistor on the base substrate;

the second semiconductor layer comprises an active layer of at least one oxide transistor, the second conductive layer comprises a second electrode plate of the storage capacitor and the first scan signal line, the third conductive layer comprises a second auxiliary signal line, and there is an overlapping region between each of an orthographic projection of the first scan signal line on the base substrate and an orthographic projection of the second auxiliary signal line on the base substrate, and an orthographic projection of the active layer of the at least one oxide transistor on the base substrate; and the fourth conductive layer comprises first electrodes and second electrodes of a plurality of polysilicon transistors and first electrodes and second electrodes of a plurality of oxide transistors, and the fifth conductive layer comprises the data signal line and the first power supply line.

10. The pixel circuit according to claim 9, wherein the polysilicon transistors comprise a first transistor, a third transistor, a fourth transistor, and a seventh transistor; and the oxide transistors comprise a second transistor, a fifth transistor, and a sixth transistor.

11. The pixel circuit according to claim 10, wherein the pixel circuit comprises a first region and a second region; and the first transistor is disposed in the first region, the first scan signal line is disposed in the second region, and a control electrode of the first transistor is connected with the first scan signal line through a connection electrode and a via.

12. The pixel circuit according to claim 10, wherein the pixel circuit comprises a first region and a second region; and the seventh transistor, the fourth transistor, and the second scan signal line are all disposed in the second region, a region where the second scan signal line is overlapped with an active layer of the fourth transistor serves as a control electrode of the fourth transistor, and a region where the second scan signal line is overlapped with an active layer of the seventh transistor serves as a control electrode of the seventh transistor.

13. The pixel circuit according to claim 10, wherein the pixel circuit comprises a first region and a second region; and the third transistor is disposed in the first region, the first scan signal line and the seventh transistor are disposed in the second region, and the first scan signal line is disposed between the third transistor and the seventh transistor.

14. A display apparatus, comprising the pixel circuit according to claim 1.

15. A method for driving a pixel circuit, used for driving the pixel circuit according to claim 1, wherein the driving method comprises:

in a reset stage, the writing sub-circuit writing the reset voltage signal of the data signal line to the second node in response to the control signal of the first scan signal line; the reset sub-circuit writing the reset voltage signal of the second node to the first node in response to control signals of the first scan signal line and the second scan signal line; and the compensation sub-circuit writing the reset voltage signal of the first node to the third node in response to the control signal of the first scan signal line;

in a data writing stage, the writing sub-circuit writing the data voltage signal of the data signal line to the second node in response to the control signal of the first scan signal line, and the compensation sub-circuit compensating the first node in response to the control signal of the first scan signal line; and in a light-emitting stage, the driving sub-circuit providing the driving current to the third node in response to the control signal of the first node.

16. The method according to claim 15, wherein the control signal of the first scan signal line and the control signal of the second scan signal line are output by a group of Gate Driver on Array circuits.

17. The method according to claim 15, wherein the control signal of the first scan signal line and the control signal of the second scan signal line are output by two groups of Gate Driver on Array circuits.

18. The method according to claim 16, wherein the data signal line comprises a plurality of signal cycles, the reset voltage signal and the data voltage signal are provided for a row of sub-pixels once in each signal cycle, and a time length of the data voltage signal is a time length of the data writing stage and a time length of the reset voltage signal is a time length of the reset stage.

19. The method according to claim 17, wherein the data signal line comprises a plurality of signal cycles, the reset voltage signal and the data voltage signal are provided for a row of sub-pixels once in each signal cycle, and a time length of the data voltage signal is a time length of the data writing stage and a time length of the reset voltage signal is a time length of the reset stage.

* * * * *